US012767507B2

(12) United States Patent
Yang et al.

(10) Patent No.: US 12,767,507 B2
(45) Date of Patent: Oct. 20, 2026

(54) CARRYING ROBOT

(71) Applicant: HAI ROBOTICS CO., LTD., Shenzhen (CN)

(72) Inventors: Chenglong Yang, Shenzhen (CN); Qingxin Zhan, Shenzhen (CN)

(73) Assignee: HAI ROBOTICS CO., LTD., Shenzhen (CN)

(*) Notice: Subject to any disclaimer, the term of this patent is extended or adjusted under 35 U.S.C. 154(b) by 320 days.

(21) Appl. No.: 18/606,277

(22) Filed: Mar. 15, 2024

(65) Prior Publication Data

US 2024/0217793 A1 Jul. 4, 2024

Related U.S. Application Data

(63) Continuation of application No. PCT/CN2022/117937, filed on Sep. 8, 2022.

(30) Foreign Application Priority Data

Sep. 18, 2021 (CN) .......................... 202111101055.8

(51) Int. Cl.

| | |
|---|---|
| ***B65G 1/04*** | (2006.01) |
| ***B66F 9/06*** | (2006.01) |
| ***B66F 9/12*** | (2006.01) |
| ***B66F 9/16*** | (2006.01) |
| ***B66F 9/18*** | (2006.01) |

(52) U.S. Cl.
CPC .............. *B66F 9/063* (2013.01); *B66F 9/125* (2013.01); *B66F 9/16* (2013.01); *B66F 9/183* (2013.01)

(58) Field of Classification Search
CPC .. B66F 9/063; B66F 9/125; B66F 9/16; B66F 9/183; B65G 1/0492; B65G 1/04; Y02T 10/70
See application file for complete search history.

(56) References Cited

U.S. PATENT DOCUMENTS

2019/0352092 A1* 11/2019 Zheng .................. B65G 1/0421
2021/0323767 A1* 10/2021 Liu ......................... B66F 9/122

FOREIGN PATENT DOCUMENTS

CN 206188345 U * 5/2017
CN 107128843 A 9/2017
CN 109437063 A * 3/2019 .............. B66F 9/183
CN 209023571 U 6/2019
(Continued)

*Primary Examiner* — Saul Rodriguez
*Assistant Examiner* — Jaimin G Patel
(74) *Attorney, Agent, or Firm* — Ladas & Parry, LLP

(57) ABSTRACT

The present disclosure provides a carrying robot which includes a movement chassis, a shelving unit, and a carrying apparatus. The shelving unit is disposed on the movement chassis. The carrying apparatus includes a connecting base and a first goods fork assembly. A first end of the connecting base is connected to a side of the shelving unit. A second end of the connecting base extends in a horizontal direction away from the shelving unit. The connecting base moves vertically relative to the shelving unit. The first goods fork assembly includes a first mounting plate which is connected to a side of the second end of the connecting base facing the movement chassis and two first side plates which are disposed opposite on two sides of the first mounting plate in a width direction of the first goods fork assembly.

18 Claims, 13 Drawing Sheets

(56) References Cited

FOREIGN PATENT DOCUMENTS

| | | | | | |
|---|---|---|---|---|---|
| CN | 110271805 | A | | 9/2019 | |
| CN | 110282314 | A | | 9/2019 | |
| CN | 110626991 | A | | 12/2019 | |
| CN | 111169981 | A | * | 5/2020 | ........... B65G 47/902 |
| CN | 111252534 | A | | 6/2020 | |
| CN | 111348362 | A | * | 6/2020 | ............... B65G 1/04 |
| CN | 111422547 | A | | 7/2020 | |
| CN | 211056639 | U | | 7/2020 | |
| CN | 111792260 | A | | 10/2020 | |
| CN | 112332610 | A | | 2/2021 | |
| CN | 212558399 | U | | 2/2021 | |
| CN | 213085371 | U | | 4/2021 | |
| CN | 112758588 | A | | 5/2021 | |
| CN | 112811168 | A | | 5/2021 | |
| CN | 214087547 | U | | 8/2021 | |
| CN | 113788259 | A | | 12/2021 | |
| GB | 1132747 | A | | 11/1968 | |
| JP | H10338490 | A | | 12/1998 | |

* cited by examiner

A

CARRYING ROBOT

CROSS-REFERENCES

This application is a continuation of International Patent Application No. PCT/CN2022/117937 filed on Sep. 8, 2022, which claims priority to Chinese Patent application Ser. No. 20/2111101055.8, filed on Sep. 18, 2021, which are incorporated herein by reference in their entireties.

TECHNICAL FIELD

The present disclosure relates to the field of smart warehouse technologies, and in particular, to a carrying robot.

BACKGROUND OF THE INVENTION

With the rapid development of artificial intelligence technologies, automation technologies, and information technologies, the intelligence level of end logistics keeps increasing, and smart warehousing is an important phase in a logistics process. In smart warehousing, a carrying robot is a major device that can implement automated carrying work. Different end effectors may be mounted on a carrying robot to complete carrying work of workpieces of various different shapes and in various different states, thereby greatly reducing heavy physical work of people.

In the related art, a carrying robot includes a movement chassis, a shelving unit, and a goods fork assembly. The shelving unit is mounted on the movement chassis. A support structure is provided at a bottom of the goods fork assembly. The goods fork assembly is connected to the shelving unit by the support structure. The support structure may carry the goods fork assembly to move vertically along the shelving unit, to access or place goods at different heights of shelving units in a warehouse.

However, a minimum take-out height of the goods fork assembly of the carrying robot is relatively large, and as a result the carrying robot cannot access or place goods at lower positions.

SUMMARY OF THE INVENTION

Embodiments of the present disclosure provide a carrying robot, so that a minimum take-out height of a carrying robot can be reduced, which helps to extend a take-out range of the carrying robot.

To achieve the foregoing objectives, embodiments of the present disclosure provide the following technical solutions:

Embodiments of the present disclosure provide a carrying robot, including a movement chassis, a shelving unit, and a carrying apparatus, where the shelving unit is disposed on the movement chassis; the carrying apparatus includes a connecting base and a first goods fork assembly, a first end of the connecting base is connected to a side of the shelving unit, a second end of the connecting base extends in a horizontal direction away from the shelving unit, and the connecting base moves vertically relative to the shelving unit; and the first goods fork assembly includes a first mounting plate and two first side plates, and the first mounting plate is connected to a side of the second end of the connecting base facing the movement chassis; and the two first side plates are disposed opposite on two sides of the first mounting plate in a width direction of the first goods fork assembly, and the two first side plates extend toward the movement chassis.

For the carrying robot described above, optionally, a first goods pallet is disposed at an end of each of the two first side plates away from the first mounting plate, and the two first goods pallets are located in a same plane and extend opposite between the two first side plates.

For the carrying robot described above, optionally, the first goods fork assembly further includes a first width adjustment mechanism, the first width adjustment mechanism includes a first width motor and at least one first bidirectional spiral screw rod, and the first width motor is mounted on the first mounting plate; and two ends of the first bidirectional spiral screw rod are respectively threadedly connected to the two first side plates, and a middle of the first bidirectional spiral screw rod is rotatably connected to the first mounting plate; and the first width motor is transmission-connected to the at least one first bidirectional spiral screw rod, and the first width motor is configured to drive the first bidirectional spiral screw rod to rotate, and is configured to drive the two first side plates to move toward each other or away from each other.

For the carrying robot described above, optionally, two first bidirectional spiral screw rods are provided, and the two first bidirectional spiral screw rods are arranged in parallel and at an interval; and the first width motor is disposed between the two first bidirectional spiral screw rods, and the first width motor simultaneously is configured to drive the two first bidirectional spiral screw rods through a synchronous belt and a pulley to rotate.

For the carrying robot described above, optionally, at least two first screw rod supports are disposed at an interval on a face of the first mounting plate away from the connecting base in an extension direction of the first bidirectional spiral screw rod, and the first bidirectional spiral screw rod is rotatably connected to the first screw rod supports.

For the carrying robot described above, optionally, a first accommodating groove is provided in the first mounting plate, and the first width motor is accommodated in the first accommodating groove.

For the carrying robot described above, optionally, in the width direction of the first goods fork assembly, a sum of widths of the two first goods pallets is less than or equal to a width of the first mounting plate.

For the carrying robot described above, optionally, a first fork arm assembly is mounted on each of the two first side plates, and the first fork arm assembly includes a first telescopic motor and a first fork arm; and the first telescopic motor is disposed on a side of the first side plate away from the first mounting plate, and the first fork arm is disposed on a side of the first side plate facing the first mounting plate; and the first telescopic motor is transmission-connected to the first fork arm, and the first telescopic motor is configured to drive the first fork arm to extend and retract in a length direction of the first goods fork assembly.

For the carrying robot described above, optionally, at least two first movable fingers are disposed at a front end of the first fork arm in an extending direction, and the at least two first movable fingers are arranged at an interval from ends close to the first mounting plate to ends away from the first mounting plate; a first end of the first movable finger is rotatably connected to the first fork arm, and a second end of the first movable finger is rotatable between the two first fork arms.

For the carrying robot described above, optionally, the connecting base includes a fixed portion and a rotatable portion, a first end of the fixed portion is connected to a side of the shelving unit, and a second end of the fixed portion extends in the horizontal direction away from the shelving unit; and the rotatable portion is rotatably sleeved on the second end of the fixed portion, and the rotatable portion is rotatable around the fixed portion in a vertical plane; and the first mounting plate is connected to the rotatable portion, to enable the rotatable portion to drive the first goods fork assembly to rotate around the fixed portion in the vertical plane.

For the carrying robot described above, optionally, a rotation range of the first goods fork assembly is 0° to 180°; a rotation start position of the first goods fork assembly is a position close to the movement chassis, a rotation stop position of the first goods fork assembly is a position far away from the movement chassis, and the first goods fork assembly reciprocally rotates between the rotation start position and the rotation stop position.

For the carrying robot described above, optionally, the rotatable portion includes a flat plate support portion and a rotation connection portion, and the rotation connection portion is connected to a face of the flat plate support portion facing the fixed portion; the first mounting plate is connected to a face of the flat plate support portion away from the fixed portion; and two rotation connection portions are provided, the two rotation connection portions are respectively located at two ends of the flat plate support portion in an extension direction of the fixed portion, and the two rotation connection portions are both rotatably sleeved on the fixed portion.

For the carrying robot described above, optionally, a vertical rotation mechanism is disposed between the two rotation connection portions, and the vertical rotation mechanism is configured to drive the rotatable portion to rotate around the fixed portion; and the vertical rotation mechanism includes a drive motor, a first gear, and a second gear, the drive motor is mounted on the face of the flat plate support portion facing the fixed portion, the first gear is fixedly sleeved on an output shaft of the drive motor, the second gear is fixedly sleeved on the fixed portion, and the first gear and the second gear are engaged with each other.

For the carrying robot described above, optionally, a motor mounting base is disposed on the face of the flat plate support portion facing the fixed portion, an avoidance groove is provided at a position of the motor mounting base corresponding to the first gear, the drive motor is mounted on the motor mounting base, and the first gear is located in the avoidance groove.

For the carrying robot described above, optionally, a rotating limiting member is further disposed on the fixed portion, and the rotating limiting member is located between the two rotation connection portions; the rotating limiting member has a first limiting face and a second limiting face, the first limiting face is disposed at an end of the rotating limiting member away from the movement chassis, and the second limiting face is disposed at an end of the rotating limiting member facing the movement chassis; and when the first goods fork assembly rotates to a position far away from the movement chassis, the flat plate support portion abuts against the first limiting face; and when the goods fork assembly rotates to a position close to the movement chassis, the flat plate support portion abuts against the second limiting face.

For the carrying robot described above, optionally, a first cylindrical portion is disposed on a side of the flat plate support portion facing the first mounting plate, and the first mounting plate is rotatably connected to an end of the first cylindrical portion away from the flat plate support portion; and a first horizontal rotation mechanism is disposed on the first mounting plate, and the first horizontal rotation mechanism is configured to drive the first mounting plate to rotate in a horizontal plane relative to the first cylindrical portion.

For the carrying robot described above, optionally, the first horizontal rotation mechanism includes a first rotation motor, a first planetary gear, a first central gear, and a first flexible member; and the first rotation motor is mounted on a side of the first mounting plate away from the first cylindrical portion, an output shaft of the first rotation motor passes through the first mounting plate and extends into a gap between the first mounting plate and the flat plate support portion, the first planetary gear is transmission-connected to the output shaft of the first rotation motor; the first central gear is fixedly sleeved on the first cylindrical portion or is formed by a peripheral face of the first cylindrical portion; and the first flexible member surrounds a periphery of the first planetary gear and the first central gear.

For the carrying robot described above, optionally, the first planetary gear and the first central gear are both sprockets, and the first flexible member is a chain; or, the first planetary gear and the first central gear are both pulleys, and the first flexible member is a transmission belt.

For the carrying robot described above, optionally, a second goods pallet is disposed at an end of each of the two first side plates close to the first mounting plate, and the two second goods pallets are located in a same plane and extend opposite between the two first side plates; and in the width direction of the first goods fork assembly, a sum of widths of the two second goods pallets is less than or equal to a width of the first mounting plate.

For the carrying robot described above, optionally, the carrying apparatus further includes a second goods fork assembly, the second goods fork assembly includes a second mounting plate and two second side plates, and the second mounting plate is connected to a side of the second end of the connecting base away from the movement chassis; and the two second side plates are disposed opposite on two sides of the second mounting plate in a width direction of the second goods fork assembly, and the two second side plates extend away from the movement chassis.

For the carrying robot described above, optionally, the connecting base includes a second cylindrical portion and a plate-shaped portion, a first end of the plate-shaped portion is connected to a side of the shelving unit, and a second end of the plate-shaped portion extends in the horizontal direction away from the shelving unit; and the second cylindrical portion is disposed at the second end of the plate-shaped portion, and the second cylindrical portion extends in a direction perpendicular to the plate-shaped portion toward two opposite faces of the plate-shaped portion; and the first mounting plate is rotatably connected to an end of the second cylindrical portion facing the movement chassis, and/or, the second mounting plate is rotatably connected to an end of the second cylindrical portion away from the movement chassis.

For the carrying robot described above, optionally, an access or place port of the first goods fork assembly and an access or place port of the second goods fork assembly both face a same direction, and an end of the first mounting plate close to the access or place port of the first goods fork assembly and an end of the second mounting plate close to the access or place port of the second goods fork assembly are connected by at least one connecting post; and the connecting post enables the first mounting plate and the second mounting plate to synchronously rotate.

For the carrying robot described above, optionally, a second horizontal rotation mechanism is disposed on at least one of the first mounting plate and the second mounting plate, and the second horizontal rotation mechanism is configured to drive at least one of the first mounting plate and the second mounting plate to rotate.

For the carrying robot described above, optionally, the second horizontal rotation mechanism includes a second rotation motor, a second planetary gear, a second central gear, and a second flexible member; and the second rotation motor is mounted on a side of the second mounting plate away from the plate-shaped portion, an output shaft of the second rotation motor passes through the second mounting plate and extends into a gap between the second mounting plate and the plate-shaped portion, and the second planetary gear is transmission-connected to the output shaft of the second rotation motor; the second central gear is fixedly sleeved on the second cylindrical portion or is formed by a peripheral face of the second cylindrical portion; and the second flexible member surrounds a periphery of the second planetary gear and the second central gear.

For the carrying robot described above, optionally, the second planetary gear and the second central gear are both sprockets, and the second flexible member is a chain; or, the second planetary gear and the second central gear are both pulleys, and the second flexible member is a transmission belt.

For the carrying robot described above, optionally, the second goods fork assembly further includes a second width adjustment mechanism, the second width adjustment mechanism includes a second width motor and at least one second bidirectional spiral screw rod, and the second width motor is mounted on the second mounting plate; and two ends of the second bidirectional spiral screw rod are respectively threadedly connected to the two second side plates, and a middle of the second bidirectional spiral screw rod is rotatably connected to the second mounting plate; and the second width motor is transmission-connected to the at least one second bidirectional spiral screw rod, and the second width motor is configured to drive the second bidirectional spiral screw rod to rotate, and is configured to drive the two second side plates to move toward each other or away from each other.

For the carrying robot described above, optionally, two second bidirectional spiral screw rods are provided, and the two second bidirectional spiral screw rods are arranged in parallel and at an interval; and the second width motor is disposed between the two second bidirectional spiral screw rods, and the second width motor simultaneously is configured to drive the two second bidirectional spiral screw rods through a synchronous belt and a pulley to rotate.

For the carrying robot described above, optionally, at least two second screw rod supports are disposed at an interval on a face of the second mounting plate away from the connecting base in an extension direction of the second bidirectional spiral screw rod, and the second bidirectional spiral screw rod is rotatably connected to the second screw rod supports.

For the carrying robot described above, optionally, a second accommodating groove is provided in the second mounting plate, and the second width motor is accommodated in the second accommodating groove.

For the carrying robot described above, optionally, a second fork arm assembly is mounted on each of the two second side plates, and the second fork arm assembly includes a second telescopic motor and a second fork arm; and the second telescopic motor is disposed on a side of the second side plate away from the second mounting plate, and the second fork arm is disposed on a side of the second side plate facing the second mounting plate; and the second telescopic motor is transmission-connected to the second fork arm, and the second telescopic motor is configured to drive the second fork arm to extend and retract in a length direction of the second goods fork assembly.

For the carrying robot described above, optionally, at least two second movable fingers are disposed at a front end of the second fork arm in an extending direction, and the at least two second movable fingers are arranged at an interval from ends close to the second mounting plate to ends away from the second mounting plate; and a second end of the second movable finger is rotatably connected to the second fork arm, and a second end of the second movable finger is rotatable between the two second fork arms.

For the carrying robot described above, optionally, the second goods fork assembly further includes a tray, the tray is mounted on a side of the second mounting plate away from the connecting base, and the second width adjustment mechanism is located between the tray and the second mounting plate; and in the width direction of the second goods fork assembly, a width of the tray is less than or equal to a width of the second mounting plate.

For the carrying robot described above, optionally, an elevation mechanism is disposed on a side of the shelving unit connected to the connecting base, the elevation mechanism includes a sliding block moving vertically along the shelving unit, and the connecting base is fixedly connected to the sliding block.

For the carrying robot described above, optionally, a gap exists between a projection of an end of the first goods fork assembly close to the shelving unit in an elevation direction and a projection of an end of the movement chassis close to the first goods fork assembly in the elevation direction.

For the carrying robot described above, optionally, a counterweight block is disposed at an end of the movement chassis away from the first goods fork assembly.

The carrying robot provided in the embodiments of the present disclosure has the following advantages:

The carrying robot provided in the embodiments of the present disclosure includes a movement chassis, a shelving unit, and a carrying apparatus, where the shelving unit is disposed on the movement chassis. The carrying apparatus includes a connecting base and a first goods fork assembly, a first end of the connecting base is connected to a side of the shelving unit, a second end of the connecting base extends in a horizontal direction away from the shelving unit, the first goods fork assembly is mounted at the second end of the connecting base, and the connecting base is movable vertically relative to the shelving unit, so that the first goods fork assembly mounted on the connecting base is enabled to move vertically, to access or place goods at different heights.

In addition, the first goods fork assembly includes a first mounting plate and two first side plates, and the first mounting plate is connected to a side of the second end of the connecting base facing the movement chassis; and the two first side plates are disposed opposite on two sides of the first mounting plate in a width direction of the first goods fork assembly, and the two first side plates extend toward the movement chassis. In this case, the connecting base is located at an end of the first goods fork assembly away from the movement chassis. In this way, the connecting base can be kept from affecting a minimum height by which the first goods fork assembly is lowered, to enable the first goods fork assembly to access or place goods at lower positions, which helps to extend a take-out range of the first goods fork assembly in a height direction.

In addition to the technical problems solved by the embodiments of the present disclosure, the technical features constituting the technical solutions, and the beneficial effects brought about by the technical features of these technical solutions described above, other technical problems that can be solved by the carrying robot provided by the embodiments of the present disclosure, other technical features contained in the technical solutions, and the beneficial effects brought about by these technical features will be further described in detail in the specific implementations.

BRIEF DESCRIPTION OF DRAWINGS

To describe the technical solutions in the embodiments of the present disclosure or in existing technologies more clearly, the accompanying drawings required for describing the embodiments or existing technologies are briefly described below. Apparently, the accompanying drawings in the following description show some embodiments of the present disclosure, and persons of ordinary skill in the art may still derive other drawings from these accompanying drawings without creative efforts.

REFERENCE NUMERALS

Figure 1:
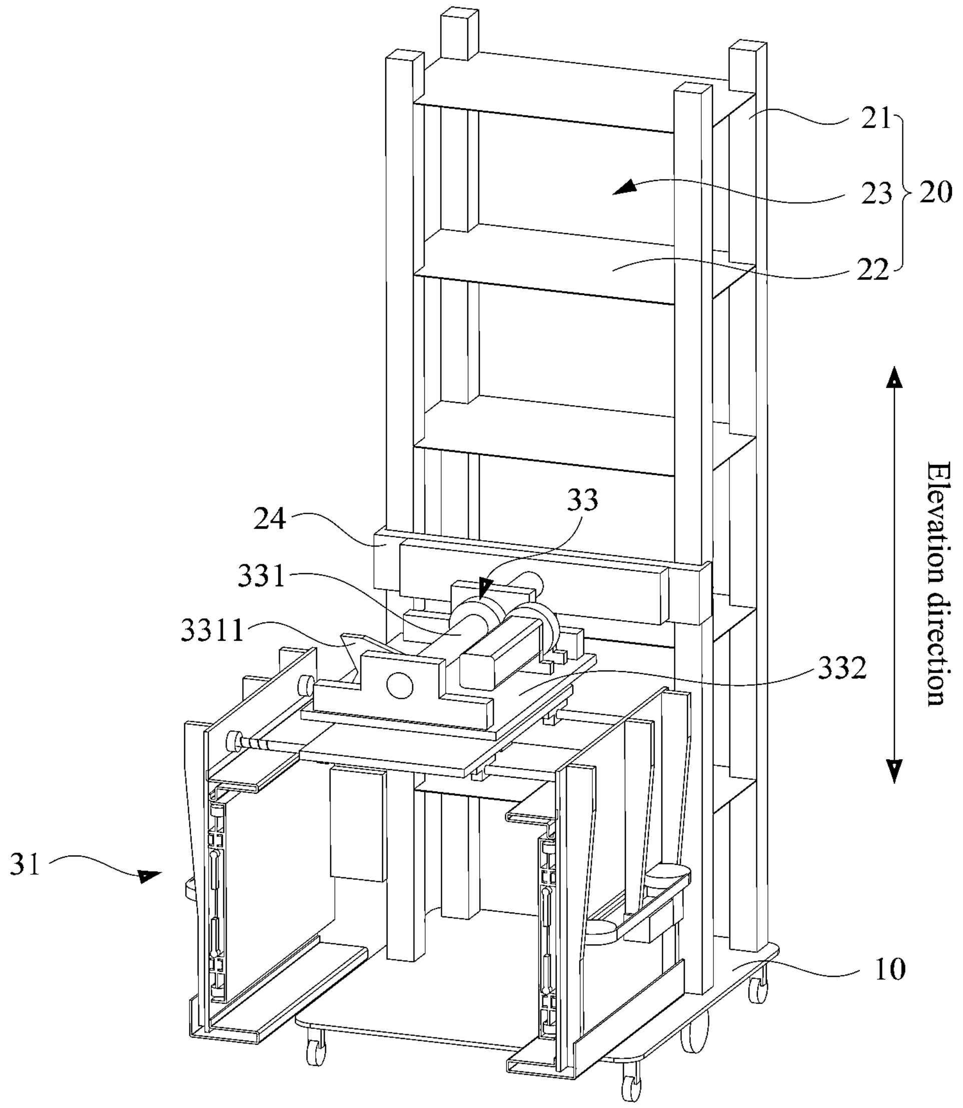
FIG. 1 is a schematic structural diagram of a carrying robot according to an embodiment of the present disclosure.

10—movement chassis; 11—counterweight block; 20—shelving unit; 21—vertical post support; 22—placement plate; 23—storage unit; 24—sliding block; 30—carrying apparatus; 31—first goods fork assembly; 311—first mounting plate; 3111—first accommodating groove; 312—first side plate; 3121—first goods pallet; 3122—second goods pallet; 313—first width adjustment mechanism; 3131—first width motor; 3132—first bidirectional spiral screw rod; 3133—first screw rod support; 314—first fork arm assembly; 3141—first telescopic motor; 3142—first fork arm; 3143—first movable finger; 3144—first fixed pushing plate; 315—first horizontal rotation mechanism; 3151—first rotation motor; 3152—first planetary gear; 3153—first central gear; 3154—first flexible member; 316—vertical rotation mechanism; 3161—drive motor; 3162—first gear; 3163—second gear; 32—second goods fork assembly; 321—second mounting plate; 3211—second accommodating groove; 322—second side plate; 3231—second width motor; 3232—second bidirectional spiral screw rod; 3233—second screw rod support; 324—second fork arm assembly; 3241—second telescopic motor; 3242—second fork arm; 3243—second movable finger; 3244—second fixed pushing plate; 325—second horizontal rotation mechanism; 3251—second rotation motor; 3252—second planetary gear; 3253—second central gear; 3254—second flexible member; 326—tray; 33—connecting base; 331—fixed portion; 3311—rotating limiting member; 332—rotatable portion; 3321—flat plate support portion; 3322—rotation connection portion; 3323—motor mounting base; 3324—first cylindrical portion; 333—second cylindrical portion; 334—plate-shaped portion; and 341—connecting post.

DETAILED DESCRIPTION

Because a support structure is provided at a bottom of a goods fork assembly of a carrying robot in the related art, the support structure causes a relatively large minimum height by which the goods fork assembly lowers along a shelving unit. As a result, the goods fork assembly cannot access or place goods at lower positions, and a take-out range of the goods fork assembly in a height direction is affected.

To resolve the foregoing problem, embodiments of the present disclosure provide a carrying robot. A first goods fork assembly of the carrying robot includes a first mounting plate and two first side plates, and the first mounting plate is connected to a side of a second end of a connecting base facing a movement chassis; and the two first side plates are disposed opposite on two sides of the first mounting plate in a width direction of the first goods fork assembly, and the two first side plates extend toward the movement chassis. In this case, the connecting base is located at an end of the first goods fork assembly away from the movement chassis. In this way, the connecting base can be kept from affecting a minimum height by which the first goods fork assembly is lowered, to enable the first goods fork assembly to access or place goods at lower positions, which helps to extend a take-out range of the first goods fork assembly in a height direction.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are merely some embodiments of the present disclosure rather than all of the embodiments. All other embodiments obtained by persons of ordinary skill in the art based on the embodiments of the present disclosure without creative efforts shall fall within the protection scope of the present disclosure.

Embodiment 1

Figure 4:
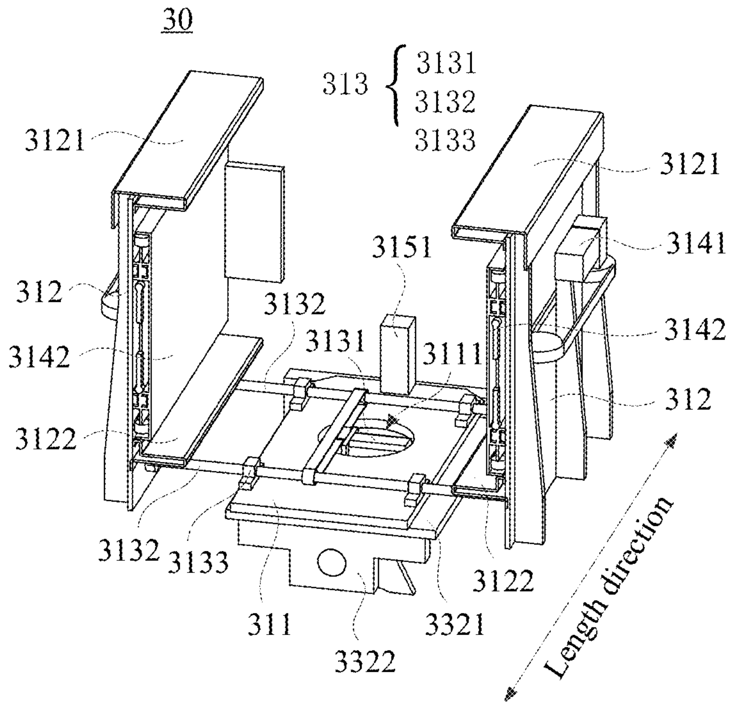
FIG. 4 is a schematic structural diagram of a carrying apparatus of the carrying robot in FIG. 1.
Figure 5:
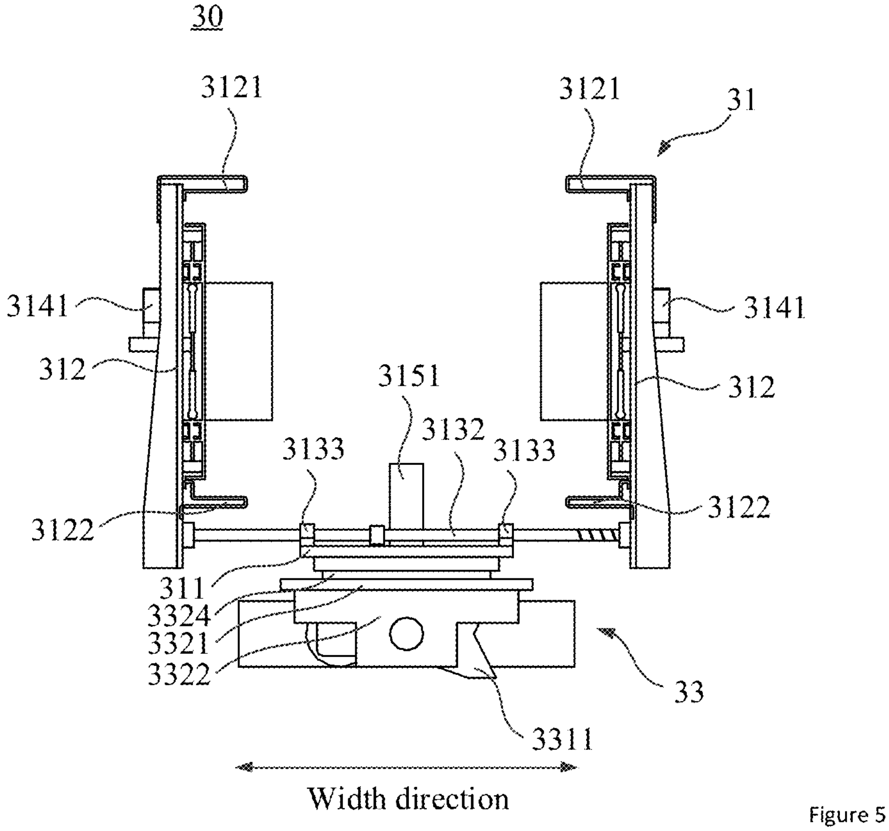
FIG. 5 is a front view of the carrying apparatus in FIG. 4.
Figure 7:
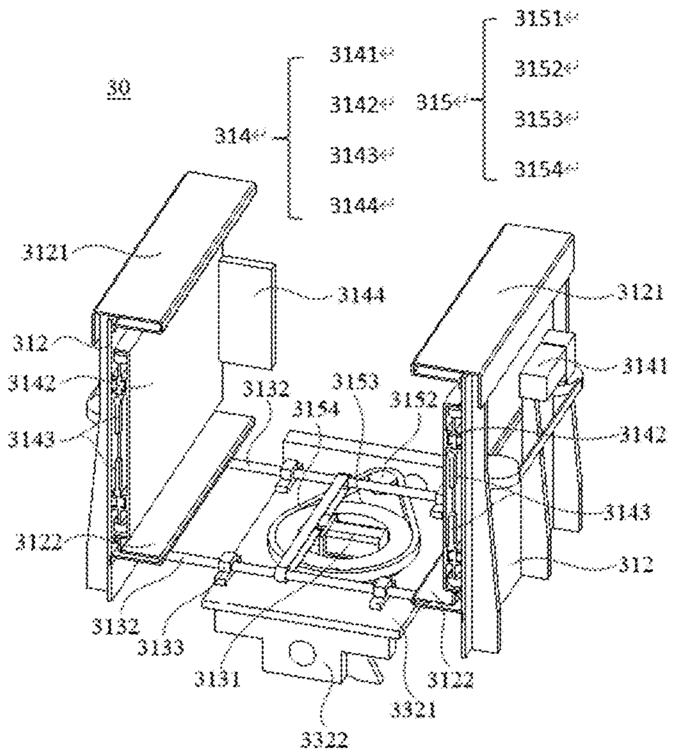
FIG. 7 is a schematic structural diagram of the carrying apparatus in FIG. 4 with a first mounting plate removed.

FIG. 1 is a schematic structural diagram of a carrying robot according to an embodiment of the present disclosure. FIG. 4 is a schematic structural diagram of a carrying apparatus of the carrying robot in FIG. 1. FIG. 5 is a front view of the carrying apparatus in FIG. 4. FIG. 7 is a schematic structural diagram of the carrying apparatus in FIG. 4 with a first mounting plate removed.

Referring to FIG. 1, FIG. 4, FIG. 5, and FIG. 7, an embodiment of the present disclosure provides a carrying robot. The carrying robot includes a movement chassis 10, a shelving unit 20, and a carrying apparatus 30. The shelving unit 20 is disposed on the movement chassis 10. The carrying apparatus 30 is disposed on the shelving unit 20.

A plurality of rollers may be disposed at a bottom of the movement chassis 10. For example, the rollers may be omni wheels. The rollers may drive the movement chassis 10 to move. A roller drive mechanism may further be disposed inside the movement chassis 10. The roller drive mechanism may drive the rollers to rotate and drive the movement chassis 10 to move. The movement chassis 10 may carry the shelving unit 20, the carrying apparatus 30, and another structure disposed on the movement chassis 10 to move.

The shelving unit 20 may include one layer or a plurality of layers of storage units 23 arranged in an elevation direction (as shown in FIG. 1). The bottommost storage unit 23 of the shelving unit 20 may be disposed on the movement chassis 10. The shelving unit 20 may include a vertical post support 21 and a plurality of placement plates 22. For example, the vertical post support 21 may include two vertical posts, three vertical posts, four vertical posts or more vertical posts. The plurality of placement plates 22 are fixed at different heights of the vertical post support 21. The placement plates 22 and the vertical post support 21 form a plurality of storage units 23 on the shelving unit 20. The movement chassis 10 may be seen as a placement plate 22 forming the bottommost storage unit 23 of the shelving unit 20.

The carrying apparatus 30 includes a connecting base 33 and a first goods fork assembly 31. A first end of the connecting base 33 is connected to a side of the shelving unit 20. For example, the connecting base 33 may be directly connected to the vertical posts of the shelving unit 20, or may be connected to the vertical posts of the shelving unit 20 by other parts. A second end of the connecting base 33 extends in a horizontal direction away from the shelving unit 20, the first goods fork assembly 31 is mounted at the second end of the connecting base 33, and the connecting base 33 is movable vertically relative to the shelving unit 20, and is configured to drive the first goods fork assembly 31 to move vertically relative to the shelving unit 20.

The first goods fork assembly 31 includes a first mounting plate 311 and two first side plates 312. The first mounting plate 311 is connected to a side of the second end of the connecting base 33 facing the movement chassis 10. The two first side plates 312 are disposed opposite on two sides of the first mounting plate 311 in a width direction of the first goods fork assembly 31, and the two first side plates 312 extend toward the movement chassis 10, so that the connecting base 33 is located at an end of the first goods fork assembly 31 away from the movement chassis 10. In this way, when the connecting base 33 carries the first goods fork assembly 31 to lower, lowering heights of ends of the two first side plates 312 close to the movement chassis 10 are not affected by the connecting base 33, and the ends can lower to a sufficiently small height, so that it is convenient to access or place goods at lower positions, which helps to extend a take-out range of the first goods fork assembly 31 in a height direction.

For example, the first goods fork assembly 31 may access or place goods in a clamping manner, or may access or place goods in a lifting manner, or may access or place goods in another manner well known to persons skilled in the art.

Referring to FIG. 4, FIG. 5, and FIG. 7, a first goods pallet 3121 may be disposed at an end of each of the two first side plates 312 away from the first mounting plate 311, and the two first goods pallets 3121 are located in a same plane and extend opposite between the two first side plates 312. When the first goods fork assembly 31 takes goods, the two first goods pallets 3121 may bear the goods, to ensure stability and reliability of taking goods by the first goods fork assembly 31. In addition, the two first goods pallets 3121 may be set to be relatively thin, to enable the first goods fork assembly 31 to be lowered to a smaller height, for example, lowered to the floor, to pick goods from the floor.

Referring to FIG. 4 and FIG. 7, the first goods fork assembly 31 may further include a first width adjustment mechanism. The first width adjustment mechanism includes a first width motor 3131 and at least one first bidirectional spiral screw rod 3132. The first width motor 3131 is mounted on the first mounting plate 311. For example, the first width motor 3131 may be directly mounted on the first mounting plate 311, or may be mounted on the first mounting plate 311 by a mounting base. Two ends of the first bidirectional spiral screw rod 3132 are respectively threadedly connected to the two first side plates 312. A middle of the first bidirectional spiral screw rod 3132 is rotatably connected to the first mounting plate 311. The first width motor 3131 is transmission-connected to the at least one first bidirectional spiral screw rod 3132. During specific implementation, the first width motor 3131 is configured to drive the first bidirectional spiral screw rod 3132 to rotate, and is configured to drive the two first side plates 312 to move toward each other or away from each other. It may be understood that threads with opposite rotational directions are disposed at the two ends of the first bidirectional spiral screw rod 3132.

In a possible implementation, two first bidirectional spiral screw rods 3132 may be provided, and the two first bidirectional spiral screw rods 3132 are arranged in parallel and at an interval. The first width motor 3131 is disposed between the two first bidirectional spiral screw rods 3132, and the first width motor 3131 simultaneously is configured to drive the two first bidirectional spiral screw rods 3132 through a synchronous belt and a pulley to rotate. The two first bidirectional spiral screw rods 3132 are disposed in parallel and at an interval, which helps to ensure that the stability and reliability of the two first side plates 312 moving toward each other or away from each other. In another possible implementation, a quantity of the first bidirectional spiral screw rods 3132 may be increased according to an actual requirement. Details are not described herein again.

For example, a synchronous pulley is sleeved on each of the two first bidirectional spiral screw rods 3132, or, a synchronous pulley is formed on a peripheral face of each of the two first bidirectional spiral screw rods 3132, and a drive pulley is sleeved on an output shaft of the first width motor 3131, or, an output shaft of the first width motor 3131 is transmission-connected to a drive pulley by a reducer. The synchronous belt is wound around on the synchronous pulleys of the two first bidirectional spiral screw rods 3132 and the drive pulley of the first width motor 3131, to enable the first width motor 3131 to drive the drive pulley to rotate. The drive pulley is configured to drive the synchronous pulleys of the two first bidirectional spiral screw rods 3132 through the synchronous belt to rotate, to enable the two first bidirectional spiral screw rods 3132 to synchronously rotate, so that the two first side plates 312 are driven to move toward each other or away from each other, making it convenient to enable the first goods fork assembly 31 to be tightly clamp goods or release goods.

Continuing to refer to FIG. 4 and FIG. 7, a first accommodating groove 3111 may be provided in the first mounting plate 311, and the first width motor 3131 is accommodated in the first accommodating groove 3111, which helps to reduce interference and increase structural compactness. The first accommodating groove 3111 may be a concave groove provided in the first mounting plate 311, and the first width motor 3131 may be accommodated and mounted in the concave groove. The first accommodating groove 3111 may be alternatively a through groove penetrating the first mounting plate 311, and the first width motor 3131 may be accommodated and mounted in the through groove. When the first accommodating groove 3111 penetrates the first mounting plate 311, the structure located below (referring to the orientation in FIG. 4) the first mounting plate 311 may be provided with an accommodating groove, to better accommodate the first width motor 3131. The first width motor 3131 may be accommodated and mounted in the through groove and the accommodating groove in the structure below the first mounting plate 311.

Referring to FIG. 4, at least two first screw rod supports 3133 may be disposed at an interval on a face of the first mounting plate 311 away from the connecting base 33 in an extension direction of the first bidirectional spiral screw rod 3132, and the first bidirectional spiral screw rod 3132 is rotatably connected to the first screw rod supports 3133. For example, a through hole may be provided in the first screw rod support 3133, and the first bidirectional spiral screw rod 3132 is rotatably passed in the through hole, or, a slot may be provided in the first screw rod support 3133, and the first bidirectional spiral screw rod 3132 is rotatably accommodated in the slot.

In consideration of that the two first side plates 312 of the first goods fork assembly 31 may move in the width direction of the first goods fork assembly 31 toward each other or away from each other, therefore, to keep the two first goods pallets 3121 from interfering with each other when the two first side plates 312 move toward each other in the width direction of the first goods fork assembly 31, it may be set in the width direction of the first goods fork assembly 31 that a sum of widths of the two first goods pallets 3121 is less than or equal to a width of the first mounting plate 311. In this way, the width adjustment mechanism of the first goods fork assembly 31 can smoothly adjust a width between the two first side plates 312, to keep the two first goods pallets 3121 from abutting against each other and restricting an adjustment range of the width between the two first side plates 312.

Referring to FIG. 4 and FIG. 5, a first fork arm assembly may be mounted on each of the two first side plates 312, and the first fork arm assembly includes a first telescopic motor 3141 and a first fork arm 3142. The first telescopic motor 3141 is disposed on a side of the first side plate 312 away from the first mounting plate 311, and the first fork arm 3142 is disposed on a side of the first side plate 312 facing the first mounting plate 311. The first telescopic motor 3141 is transmission-connected to the first fork arm 3142. For example, the first telescopic motor 3141 and the first fork arm 3142 may be transmission-connected by a gear and a rack, or may be transmission-connected by a transmission belt, or may be transmission-connected by another transmission mechanism known to persons skilled in the art, to enable the first telescopic motor 3141 to drive the first fork arm 3142 to extend and retract in a length direction of the first goods fork assembly 31.

For example, the first fork arm 3142 may include a plurality of first sub-fork arms. The plurality of first sub-fork arms are sequentially connected, and may sequentially extend or retract, which helps to increase an extension length of the first fork arm 3142. A finger structure may be disposed at a front end of the first fork arm 3142. When the first fork arm 3142 extends and takes goods, the finger structure may rotate and block an end of the goods away from the first goods fork assembly 31, making it convenient to apply a pushing force to the goods, to enable the goods to move onto the first goods fork assembly 31 along with the retraction of the first fork arm 3142.

During specific implementation, after extending, the two first fork arms 3142 on the two first side plates 312 may clamp goods from two sides of the goods and retract, to move the goods into the first goods fork assembly 31. Alternatively, in a retracted state, the two first fork arms 3142 on the two first side plates 312 clamp goods from two sides of the goods and extend, to move the goods out of the first goods fork assembly 31.

Referring to FIG. 7, at least two, for example, two, three or more, first movable fingers 3143 may be disposed at a front end of the first fork arm 3142 in an extending direction. The at least two first movable fingers 3143 are arranged at an interval in the elevation direction. A first end of the first movable finger 3143 is rotatably connected to the first fork arm 3142, and a second end of the first movable finger 3143 may be rotatable between the two first fork arms 3142. During specific implementation, in an extending process of the first fork arm 3142, the first movable finger 3143 is kept in a state of being parallel to the first fork arm 3142, to avoid hindering the first fork arm 3142 from extending to two sides of goods. When the first fork arm 3142 extends and holds goods, the first movable finger 3143 may rotate and block an end of the goods away from the connecting base 33, so that in a retraction process of the first fork arm 3142, the first movable finger 3143 may push the goods to move to the first goods fork assembly 31 following the first fork arm 3142. The at least two first movable fingers 3143 may push goods from different positions of the goods, to enable the goods to be smoothly transferred to the first goods fork assembly 31. The at least two first movable fingers 3143 may rotate and open in the same direction or in opposite directions.

Continuing to refer to FIG. 7, a first fixed pushing plate 3144 may be disposed at a rear end of the first fork arm 3142 in the extending direction, and a shape of the first fixed pushing plate may be a rectangle or may be another shape. During specific implementation, in a process in which the first fork arm 3142 extends and transfers goods on the first goods fork assembly 31, the first fixed pushing plate 3144 may push the goods from the rear of the goods in the extending direction, to smoothly transfer the goods out from the first goods fork assembly 31.

Referring to FIG. 1, an elevation mechanism may be disposed on a side of the shelving unit 20 connected to the connecting base 33. The elevation mechanism includes a sliding block 24 moving vertically along the shelving unit 20. The connecting base 33 is fixedly connected to the sliding block 24. For example, the elevation mechanism may include an elevation motor and an elevation transmission assembly. The elevation transmission assembly may be a transmission belt and a transmission pulley disposed on the vertical posts of the shelving unit 20. The transmission belt extends in a height direction of the vertical posts of the shelving unit 20. Alternatively, the elevation transmission assembly may be a sprocket and a chain disposed on the vertical posts of the shelving unit 20. The chain extends in the height direction of the vertical posts of the shelving unit 20. The sliding block 24 may be driven by the transmission belt or the chain to move vertically along the vertical posts of the shelving unit 20, to drive the connecting base 33 to move vertically along the vertical posts of the shelving unit 20, so that the carrying apparatus 30 is enabled to move vertically along the shelving unit 20.

Optionally, a gap may exist between a projection of an end of the first goods fork assembly 31 close to the shelving unit 20 in the elevation direction and a projection of an end of the movement chassis 10 close to the first goods fork assembly 31 in the elevation direction, to keep the movement chassis 10 from affecting a lowering range of the first goods fork assembly 31 and enable a bottom of the first goods fork assembly 31 to lower to the floor, which helps to further reduce a minimum take-out height of the first goods fork assembly 31, and helps to extend the take-out range of the first goods fork assembly 31 in the height direction.

Optionally, a counterweight block may be disposed at an end of the movement chassis 10 away from the first goods fork assembly 31, and the counterweight block may balance the center of gravity of the carrying robot, to ensure the stability of the carrying robot in a working process. For example, the counterweight block may be a thin sheet, and thin-sheet counterweight blocks may be stacked. During specific application, a quantity of the counterweight blocks may be flexibly adjusted according to an actual requirement, to ensure that the center of gravity of the carrying robot is stable.

In summary, for the carrying robot provided in this embodiment of the present disclosure, the first mounting plate 311 is connected to a side of the second end of the connecting base 33 facing the movement chassis 10; and the two first side plates 312 are disposed opposite on two sides of the first mounting plate 311 in the width direction of the first goods fork assembly 31, and the two first side plates 312 extend toward the movement chassis 10, so that the connecting base 33 is located at an end of the first goods fork assembly away from the movement chassis. In this way, the connecting base 33 can be kept from affecting a minimum height by which the first goods fork assembly 31 is lowered, to enable the first goods fork assembly 31 to access or place goods at lower positions, which helps to extend the take-out range of the first goods fork assembly 31 in the height direction.

Embodiment 2

Figure 2:
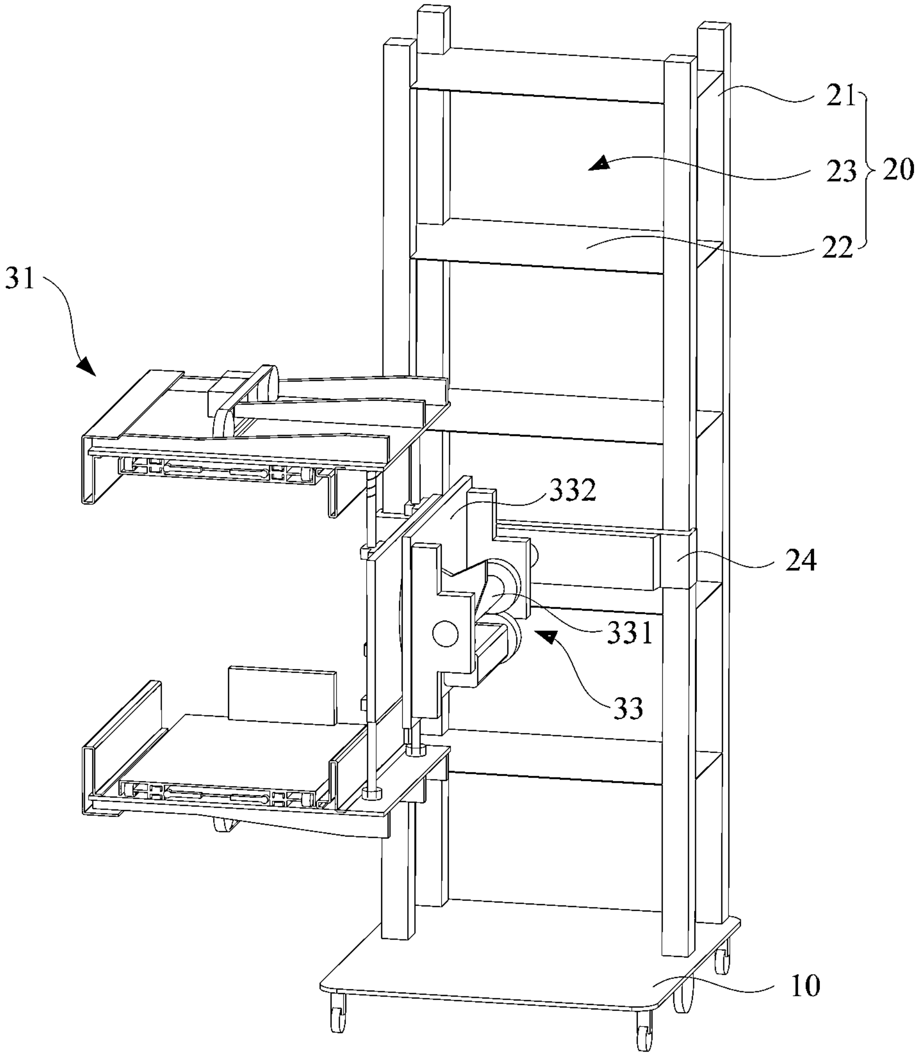
FIG. 2 is a schematic structural diagram of a first goods fork assembly of the carrying robot in FIG. 1 rotating by 90°.
Figure 3:
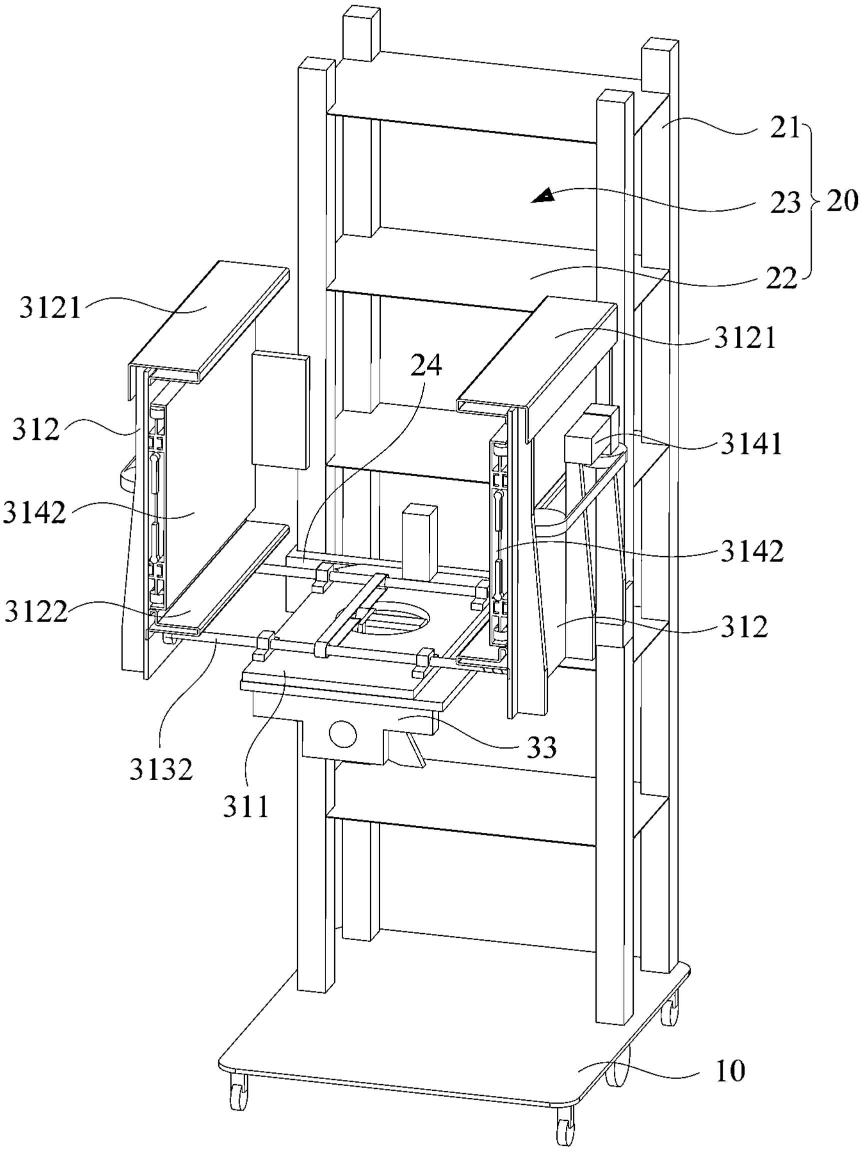
FIG. 3 is a schematic structural diagram of a first goods fork assembly of the carrying robot in FIG. 1 rotating by 180°.
Figure 6:
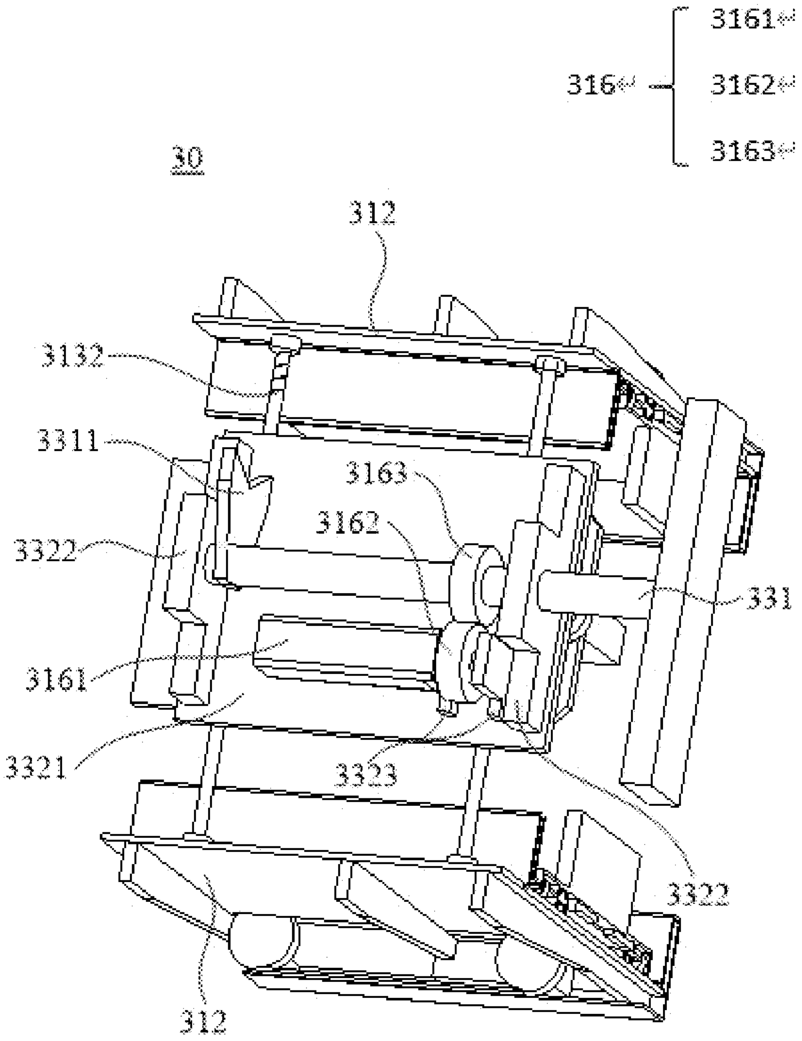
FIG. 6 is a schematic structural diagram of the carrying apparatus in FIG. 4 from another viewing angle.

FIG. 2 is a schematic structural diagram of a first goods fork assembly of the carrying robot in FIG. 1 rotating by 90°. FIG. 3 is a schematic structural diagram of a first goods fork assembly of the carrying robot in FIG. 1 rotating by 180°. FIG. 6 is a schematic structural diagram of the carrying apparatus in FIG. 4 from another viewing angle.

Referring to FIG. 1 to FIG. 7, on the basis of Embodiment 1, an embodiment of the present disclosure provides a carrying robot. For the connecting base 33 of the carrying robot, the connecting base 33 includes a fixed portion 331 and a rotatable portion 332. A first end of the fixed portion 331 is connected to a side of the shelving unit 20, and a second end of the fixed portion 331 extends in the horizontal direction away from the shelving unit 20. The rotatable portion 332 is rotatably sleeved on the second end of the fixed portion 331, and the rotatable portion 332 rotates around the fixed portion 331 in a vertical plane. For example, a main structure of the fixed portion 331 may be cylindrical, and the rotatable portion 332 is sleeved on the cylindrical fixed portion 331, making it convenient to rotate around the fixed portion 331.

The first mounting plate 311 is connected to the rotatable portion 332, to enable the rotatable portion 332 to drive the first goods fork assembly 31 to rotate around the fixed portion 331 in the vertical plane. That is, when the first goods fork assembly 31 is located on a side of the connecting base 33 facing the movement chassis 10, the first goods fork assembly 31 may access or place goods at relatively low positions. When the first goods fork assembly 31 rotates to a side of the connecting base 33 away from the movement chassis 10, the first goods fork assembly 31 may access or place goods at relatively high positions, which helps to extend a take-out range of the first goods fork assembly 31 in a height direction.

Referring to FIG. 1 to FIG. 3, a rotation range of the first goods fork assembly 31 may be 0° to 180°. A rotation start position of the first goods fork assembly 31 is a position close to the movement chassis 10, that is, a 0° position. A rotation stop position of the first goods fork assembly 31 is a position far away from the movement chassis 10, that is, a 180° position. The first goods fork assembly 31 may reciprocally rotate between the rotation start position and the rotation stop position. Optionally, the first goods fork assembly 31 may stop at any position in the rotation range, for example, a 90° position, a 60° position, a 120° position, or the like, according to an actual requirement.

Referring to FIG. 4 to FIG. 7, the rotatable portion 332 may include a flat plate support portion 3321 and a rotation connection portion 3322. The rotation connection portion 3322 is connected to a face of the flat plate support portion 3321 facing the fixed portion 331. Optionally, the flat plate support portion 3321 may be horizontally disposed, and the rotation connection portion 3322 and the flat plate support portion 3321 may be integrally formed. The first mounting plate 311 is connected to a face of the flat plate support portion 3321 away from the fixed portion 331.

For example, two rotation connection portions 3322 may be provided. The two rotation connection portions 3322 are respectively located at two ends of the flat plate support portion 3321 in an extension direction of the fixed portion 331. The two rotation connection portions 3322 are both rotatably sleeved on the fixed portion 331. This helps to ensure smoothness and reliability when the rotatable portion 332 rotates relative to the fixed portion 331, to help to ensure smoothness and reliability when the first goods fork assembly 31 rotates. Certainly, three, four or more rotation connection portions 3322 may be provided. The plurality of rotation connection portions 3322 are sleeved on the fixed portion 331 at intervals.

Referring to FIG. 6, a vertical rotation mechanism may be disposed between the two rotation connection portions 3322. The vertical rotation mechanism is configured to drive the rotatable portion 332 to rotate around the fixed portion 331. The vertical rotation mechanism is disposed between the two rotation connection portions 3322, which helps to fully utilize a space between the two rotation connection portions 3322, thereby increasing structural compactness. Certainly, the vertical rotation mechanism may be disposed at another position of the connecting base 33 according to an actual requirement, provided that the rotatable portion 332 can be driven to rotate relative to the fixed portion 331. Details are not described herein again.

The vertical rotation mechanism may include a drive motor 3161, a first gear 3162, and a second gear 3163. The drive motor 3161 is mounted on the face of the flat plate support portion 3321 facing the fixed portion 331. The first gear 3162 is fixedly sleeved on an output shaft of the drive motor 3161. The second gear 3163 is fixedly sleeved on the fixed portion 331. The first gear 3162 and the second gear 3163 are engaged with each other. During specific implementation, the output shaft of the drive motor 3161 is configured to drive the first gear 3162 to rotate, and the first gear 3162 rotates around the second gear 3163, to drive the first mounting plate 311 through the flat plate support portion 3321, to further drive the first goods fork assembly 31 to rotate around the fixed portion 331.

For example, a motor mounting base 3323 may be disposed on the face of the flat plate support portion 3321 facing the fixed portion 331. An avoidance groove is provided at a position of the motor mounting base 3323 corresponding to the first gear 3162. The drive motor 3161 is mounted on the motor mounting base 3323. The first gear 3162 is located in the avoidance groove. Certainly, the drive motor 3161 may be directly mounted on the flat plate support portion 3321.

A rotating limiting member 3311 may be further disposed on the fixed portion 331. The rotating limiting member 3311 may be located between the two rotation connection portions 3322, or, the rotating limiting member 3311 may be disposed at another position according to an actual requirement. The rotating limiting member 3311 has a first limiting face and a second limiting face. The first limiting face is disposed at an end of the rotating limiting member 3311 away from the movement chassis 10. The second limiting face is disposed at an end of the rotating limiting member 3311 facing the movement chassis 10.

During specific implementation, when the first goods fork assembly 31 rotates to the position far away from the movement chassis 10, the flat plate support portion 3321 abuts against the first limiting face. When the goods fork assembly 31 rotates to the position close to the movement chassis 10, the flat plate support portion 3321 abuts against the second limiting face. In this way, the rotation range of the first goods fork assembly 31 can be limited, and this helps to ensure stability when the first goods fork assembly 31 stops at the position away from the movement chassis 10 and the position close to the movement chassis 10, to further help to ensure stability when the first goods fork assembly 31 accesses or places goods.

Referring to FIG. 5 and FIG. 7, a first cylindrical portion 3324 may be disposed on a side of the flat plate support portion 3321 facing the first mounting plate 311. For example, the first cylindrical portion 3324 and the flat plate support portion 3321 may be integrally formed. The first mounting plate 311 is rotatably connected to an end of the first cylindrical portion 3324 away from the flat plate support portion 3321. For example, the first mounting plate 311 may be directly sleeved on the first cylindrical portion 3324, and may rotate around the first cylindrical portion 3324, or, a bearing may be disposed between the first mounting plate 311 and the first cylindrical portion 3324, to enable the first mounting plate 311 to rotate around the first cylindrical portion 3324.

A first horizontal rotation mechanism may be disposed on the first mounting plate 311, and the first horizontal rotation mechanism is configured to drive the first mounting plate 311 to rotate in a horizontal plane relative to the first cylindrical portion 3324, to enable the first goods fork assembly 31 to rotate in the horizontal plane relative to the first cylindrical portion 3324, making it convenient to access or place goods in different directions.

Continuing to referring to FIG. 5 and FIG. 7, the first horizontal rotation mechanism may include a first rotation motor 3151, a first planetary gear 3152, a first central gear 3153, and a first flexible member 3154. The first rotation motor 3151 is mounted on a side of the first mounting plate 311 away from the first cylindrical portion 3324. An output shaft of the first rotation motor 3151 passes through the first mounting plate 311 and extends into a gap between the first mounting plate 311 and the flat plate support portion 3321. The first planetary gear 3152 is transmission-connected to the output shaft of the first rotation motor 3151. For example, the first planetary gear 3152 may be directly fixedly sleeved on the output shaft of the first rotation motor 3151 to implement transmission connection, or, the first planetary gear 3152 is transmission-connected to the output shaft of the first rotation motor 3151 by a reducer. The first central gear 3153 is fixedly sleeved on the first cylindrical portion 3324 or is formed by a peripheral face of the first cylindrical portion 3324. The first flexible member 3154 surrounds a periphery of the first planetary gear 3152 and the first central gear 3153.

During specific implementation, the output shaft of the first rotation motor 3151 is configured to drive the first planetary gear 3152 to rotate. The first planetary gear 3152 rotates and at the same time is pulled by the first flexible member 3154 to rotate around the first central gear 3153, to drive the first mounting plate 311 to rotate. The first mounting plate 311 is configured to drive the two first side plates 312 to rotate, to enable the first goods fork assembly 31 to rotate in the horizontal plane.

For example, the first planetary gear 3152 and the first central gear 3153 may both be sprockets, and the first flexible member 3154 is a chain; or, the first planetary gear 3152 and the first central gear 3153 may both be pulleys, and the first flexible member 3154 is a transmission belt.

Referring to FIG. 4, FIG. 5, and FIG. 7, a second goods pallet 3122 is disposed at an end of each of the two first side plates 312 close to the first mounting plate 311, and the two second goods pallets 3122 are located in a same plane and extend opposite between the two side plates 312. A width adjustment mechanism may be located between the second goods pallet 3122 and the first mounting plate 311. When the first goods fork assembly 31 rotates to an end away from the movement chassis 10 and takes goods, the two second goods pallets 3122 may bear the goods, so that the stability and reliability of taking goods by the first goods fork assembly 31 can be ensured, and goods can be kept at a distance from a mechanism located on a side of the second goods pallet 3122 facing the first mounting plate 311, to avoid interference.

Optionally, in the width direction of the first goods fork assembly 31, a sum of widths of the two second goods pallets 3122 is less than or equal to a width of the first mounting plate 311. In this way, the width adjustment mechanism of the first goods fork assembly 31 can smoothly adjust a width between the two first side plates 312, to keep the two first goods pallets 3122 from abutting against each other and restricting an adjustment range of the width between the two first side plates 312.

In summary, for the carrying robot provided in this embodiment of the present disclosure, the first goods fork assembly 31 is rotatably disposed in the vertical plane around the connecting base 33. In one aspect, the first goods fork assembly 31 may be located at an end close to the movement chassis 10 to enable the connecting base 33 to be located at an end of the first goods fork assembly 31 away from the movement chassis, to keep the connecting base 33 from affecting a minimum height by which the first goods fork assembly 31 lowers, so that the first goods fork assembly 31 can access or place goods at lower positions. In another aspect, the first goods fork assembly 31 may rotate to the end away from the movement chassis 10, to enable the first goods fork assembly 31 to access or place goods at relatively high positions, which helps to extend the take-out range of the first goods fork assembly 31 in the height direction.

Embodiment 3

Figure 8:
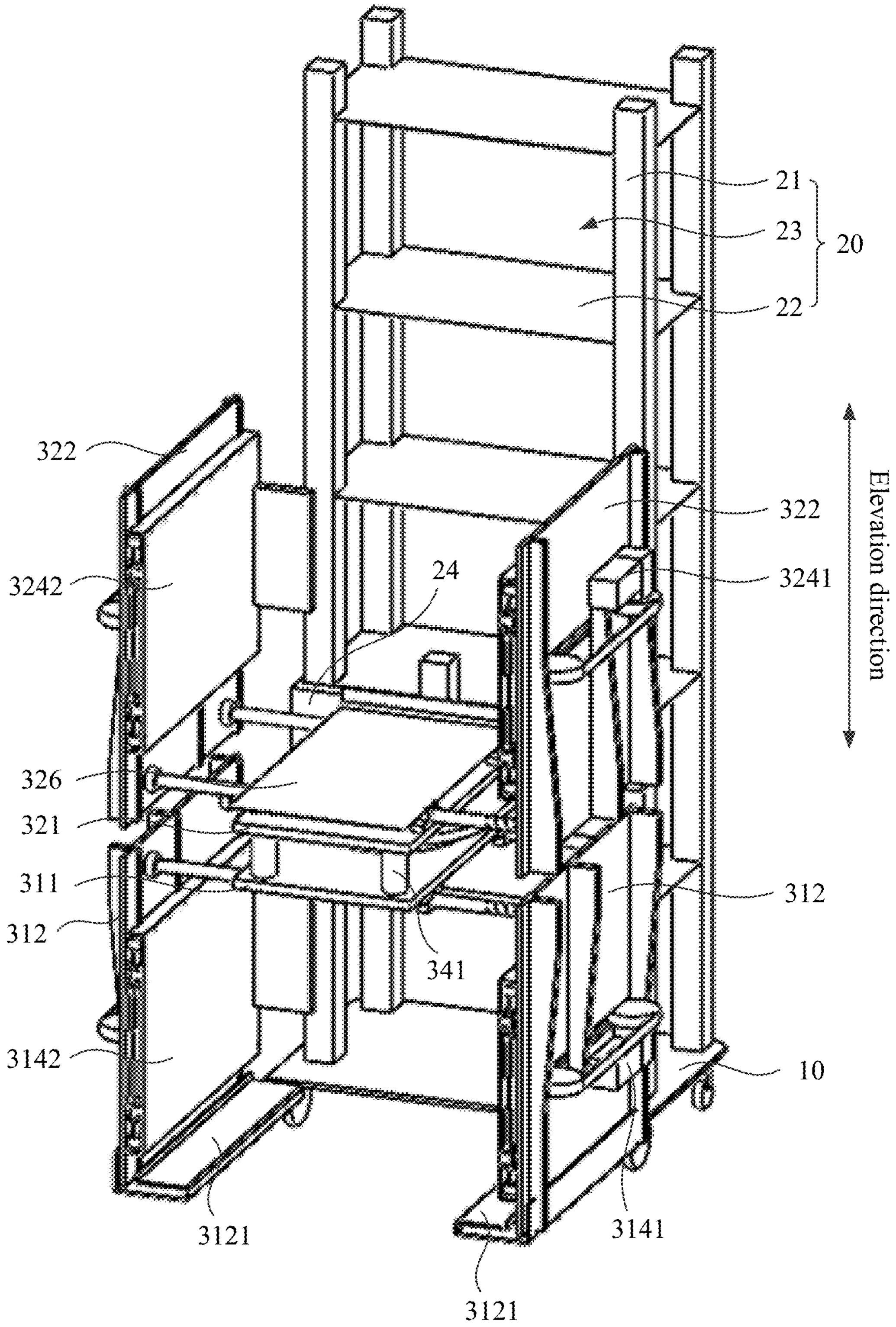
FIG. 8 is a schematic structural diagram of another carrying robot according to an embodiment of the present disclosure.
Figure 9:
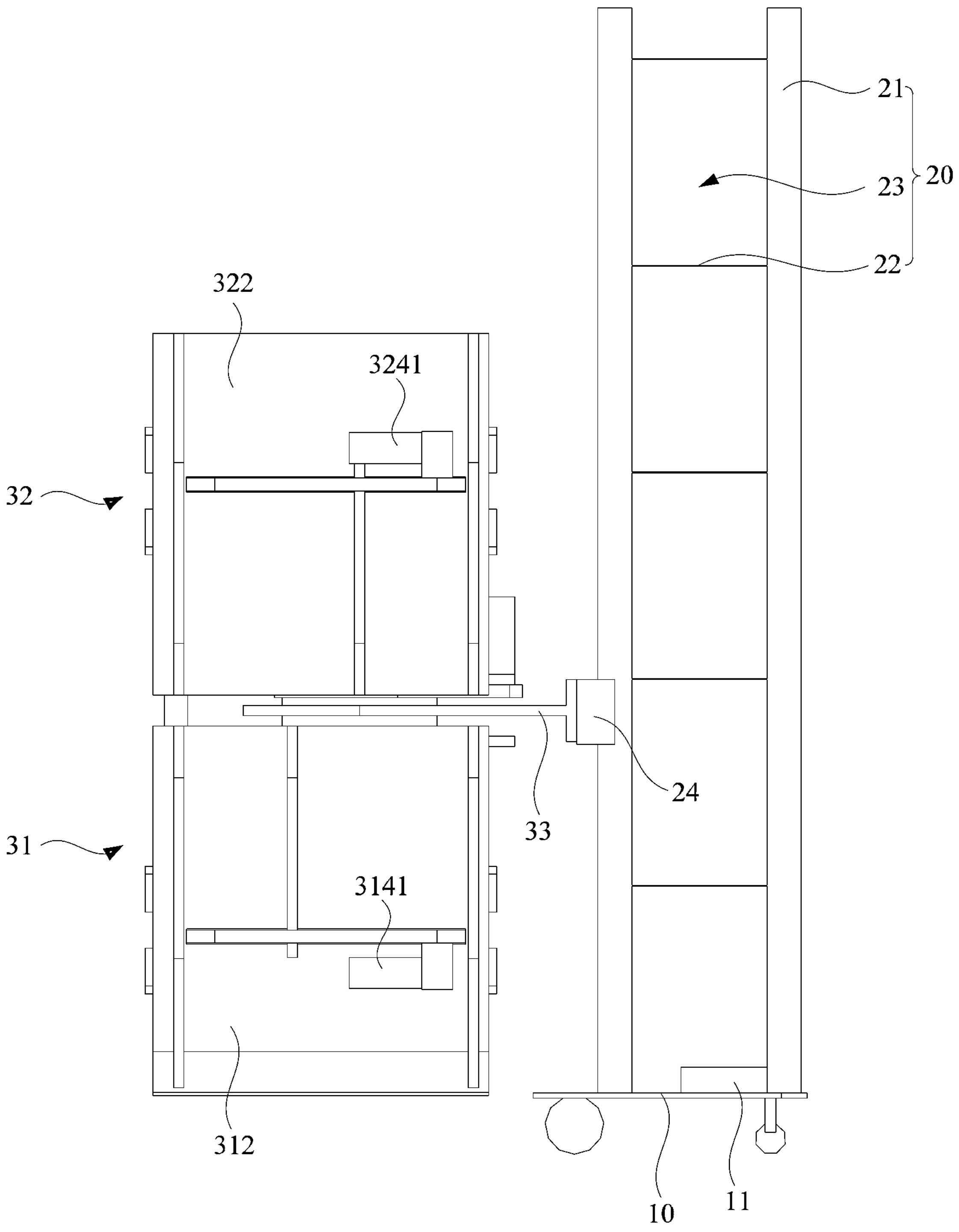
FIG. 9 is a side view of the carrying robot in FIG. 8.
Figure 10:
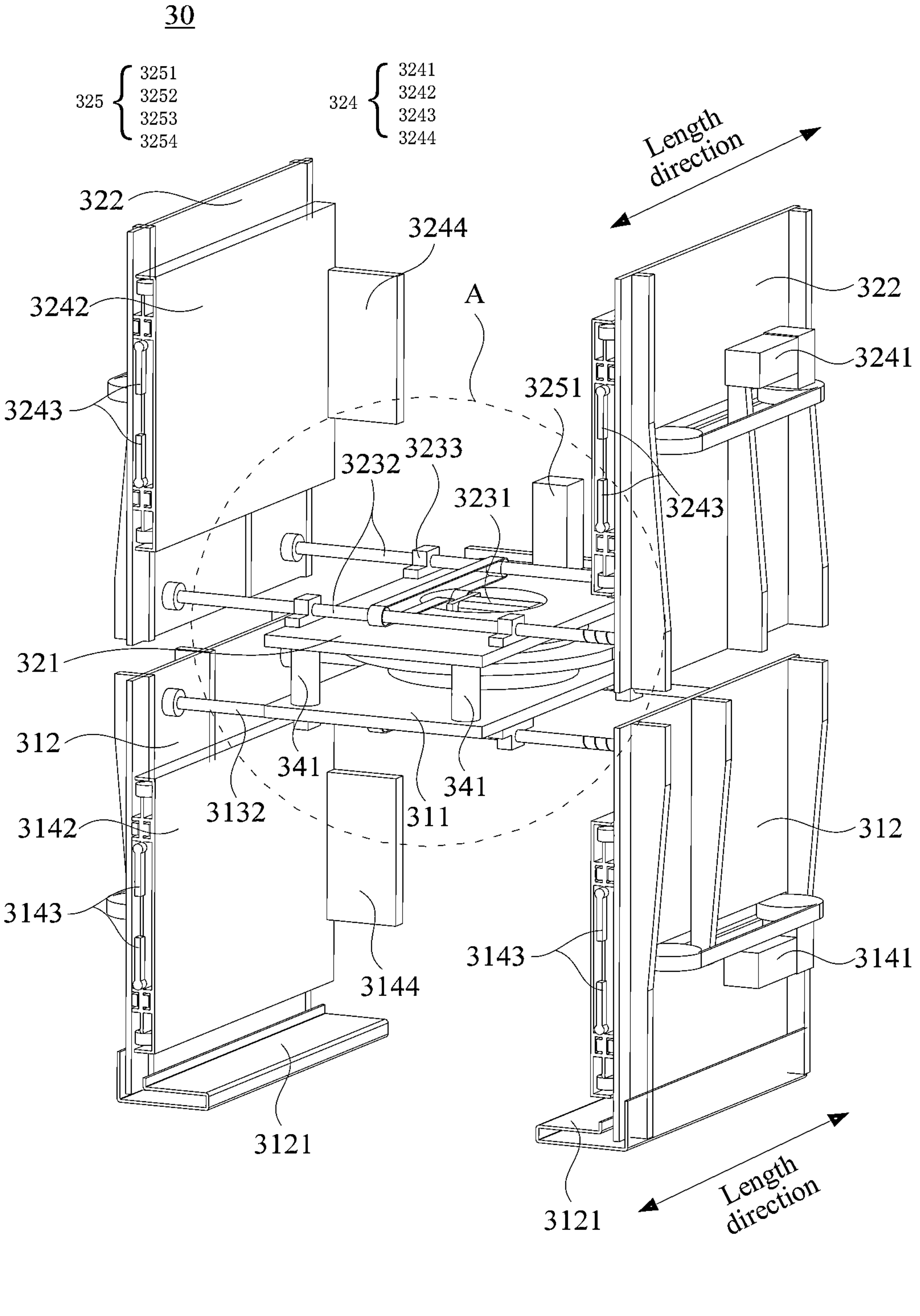
FIG. 10 is a schematic structural diagram of a carrying apparatus of the carrying robot in FIG. 8 from a first viewing angle.
Figure 11:
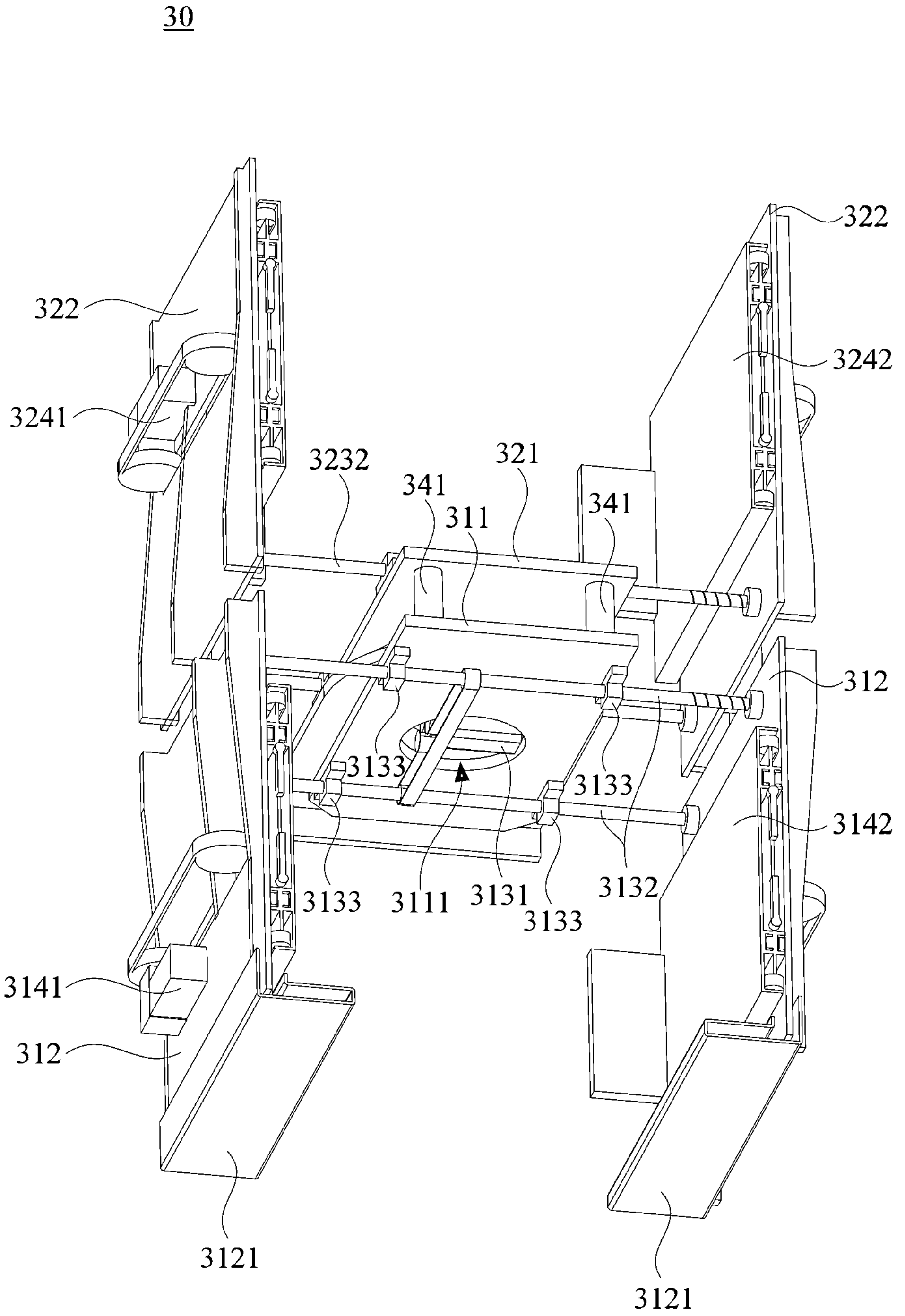
FIG. 11 is a schematic structural diagram of the carrying apparatus in FIG. 10 from a second viewing angle.
Figure 12:
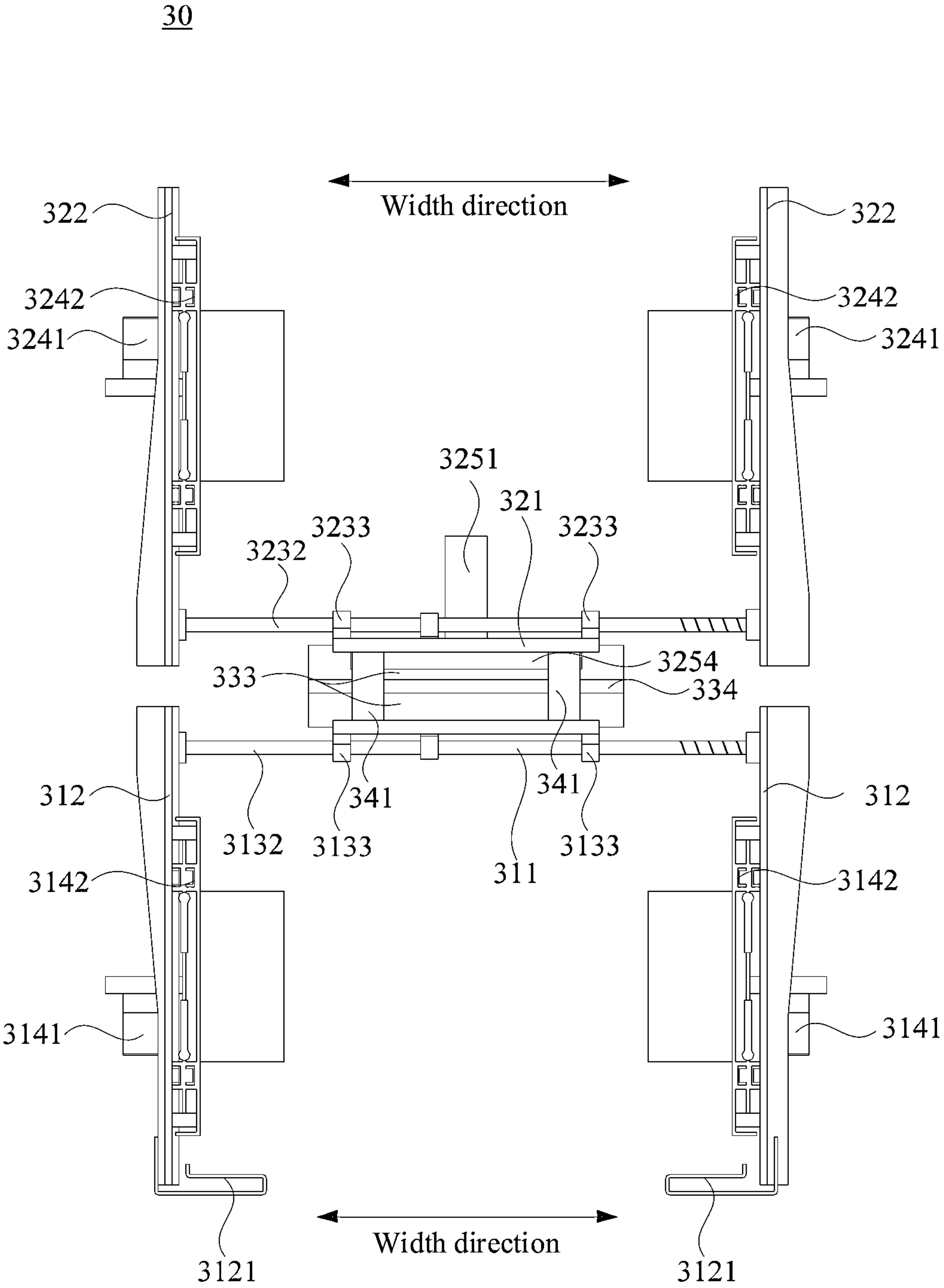
FIG. 12 is a front view of the carrying apparatus in FIG. 10.
Figure 13:
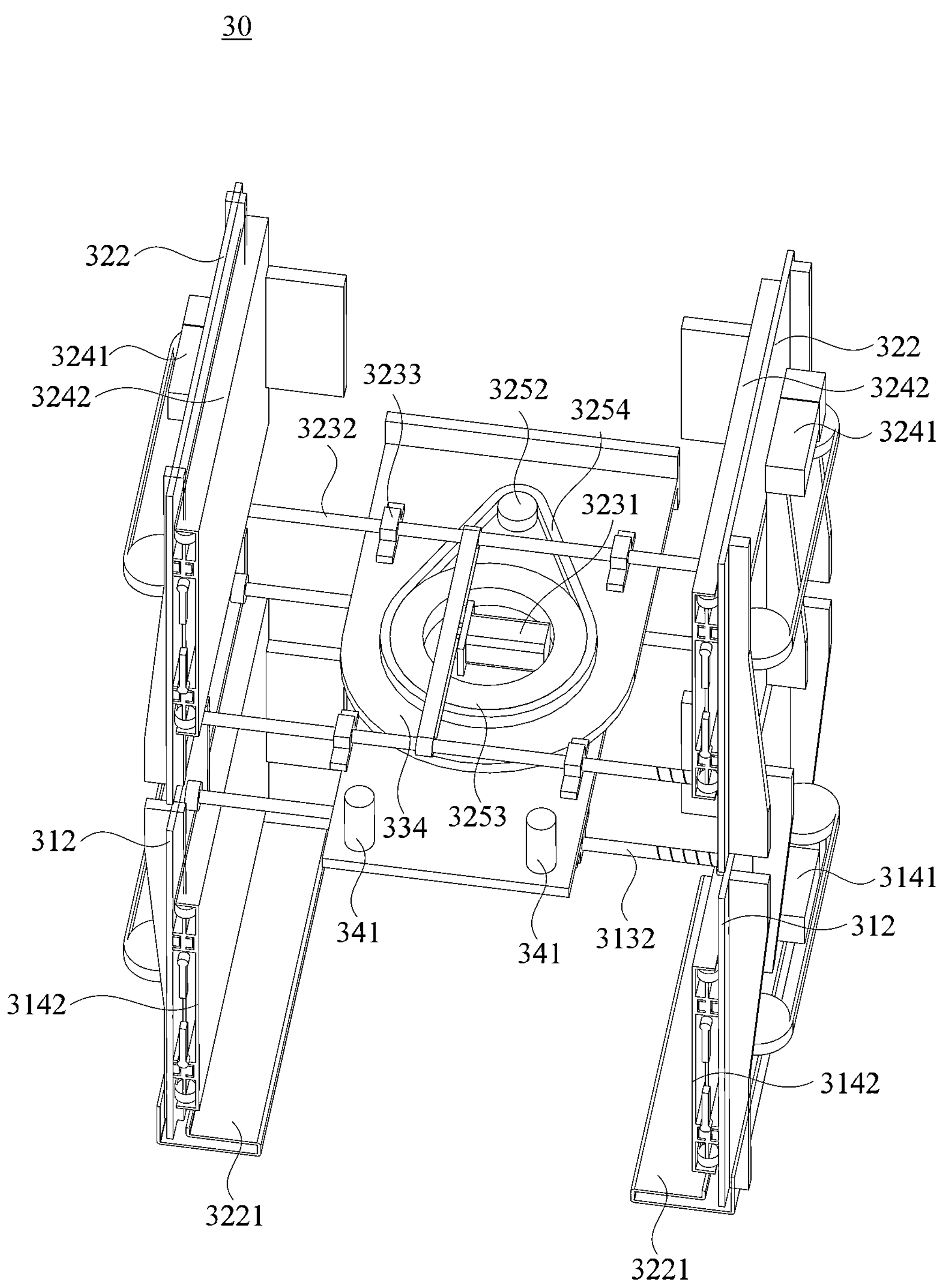
FIG. 13 is a schematic structural diagram of the carrying apparatus in FIG. 10 with a second mounting plate omitted.
Figure 14:
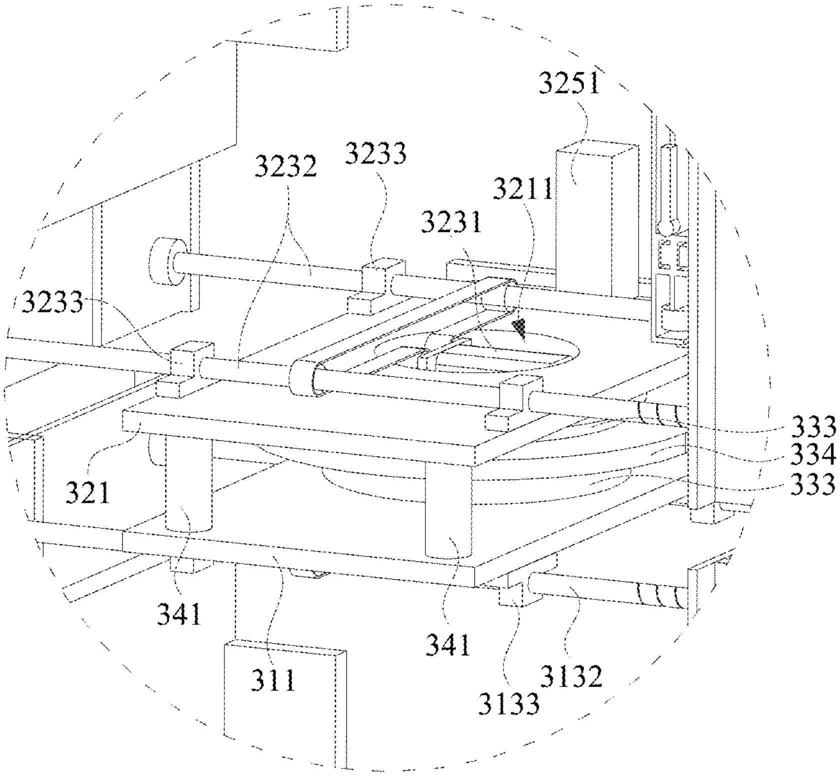
FIG. 14 is an enlarged view of A in FIG. 10.

FIG. 8 is a schematic structural diagram of another carrying robot according to an embodiment of the present disclosure. FIG. 9 is a side view of the carrying robot in FIG. 8. FIG. 10 is a schematic structural diagram of a carrying apparatus of the carrying robot in FIG. 8 from a first viewing angle. FIG. 11 is a schematic structural diagram of the carrying apparatus in FIG. 10 from a second viewing angle. FIG. 12 is a front view of the carrying apparatus in FIG. 10. FIG. 13 is a schematic structural diagram of the carrying apparatus in FIG. 10 with a second mounting plate omitted. FIG. 14 is an enlarged view of A in FIG. 10.

Referring to FIG. 8 to FIG. 14, on the basis of Embodiment 1, an embodiment of the present disclosure provides a carrying robot. The carrying apparatus 30 of the carrying robot further includes a second goods fork assembly 32. The second goods fork assembly 32 includes a second mounting plate 321 and two second side plates 322. The second mounting plate 321 is connected to a side of the second end of the connecting base 33 away from the movement chassis 10. The two second side plates 322 are disposed opposite on two sides of the second mounting plate 321 in a width direction of the second goods fork assembly 32, and the two second side plates 322 extend in a direction away from the movement chassis 10. In this way, the carrying robot may simultaneously perform two carrying tasks, which helps to increase the carrying efficiency of the carrying robot, and reduce a time taken to access or place goods.

During specific implementation, the connecting base 33 moves vertically along the shelving unit 20, and is configured to drive the first goods fork assembly 31 and the second goods fork assembly 32 to move vertically to a height of target goods. For example, the first goods fork assembly 31 and the second goods fork assembly 32 may be respectively aligned with one upper layer and one lower layer of a warehouse shelving unit, making it convenient to simultaneously takes goods on the upper layer and the lower layer of the warehouse shelving unit. Certainly, the first goods fork assembly 31 and the second goods fork assembly 32 may separately work to take goods, or, one of the first goods fork assembly 31 and the second goods fork assembly 32 may take goods, and the other places goods, which helps to improve the flexibly of accessing or placing goods by the carrying apparatus 30.

Referring to FIG. 12 to FIG. 14, the connecting base 33 includes a second cylindrical portion 333 and a plate-shaped portion 334. A first end of the plate-shaped portion 334 is connected to a side of the shelving unit 20, and a second end of the plate-shaped portion 334 extends in a horizontal direction away from the shelving unit 20. The second cylindrical portion 333 is disposed at the second end of the plate-shaped portion 334, and the second cylindrical portion 333 extends in a direction perpendicular to the plate-shaped portion 334 toward two opposite faces of the plate-shaped portion 334. For example, the second cylindrical portion 333 and the plate-shaped portion 334 may be an integrally formed integral member, or may be fixedly connected together through welding, a slot and hook connection, a threaded connection, or in another manner.

Optionally, the first mounting plate 311 is rotatably connected to an end of the second cylindrical portion 333 facing the movement chassis 10. For example, the first mounting plate 311 may be directly sleeved on the second cylindrical portion 333, and may rotate around the second cylindrical portion 333, or, a bearing may be disposed between the first mounting plate 311 and the second cylindrical portion 333, to enable the first mounting plate 311 to rotate around the second cylindrical portion 333.

Optionally, the second mounting plate 321 is rotatably connected to an end of the second cylindrical portion 333 away from the movement chassis 10. For example, the second mounting plate 321 may be directly sleeved on the second cylindrical portion 333, and may rotate around the second cylindrical portion 333, or, a bearing may be disposed between the second mounting plate 321 and the second cylindrical portion 333, to enable the second mounting plate 321 to rotate around the second cylindrical portion 333.

During specific implementation, the first goods fork assembly 31 may be driven by the first mounting plate 311 to separately rotate around the second cylindrical portion 333, to access or place goods in different directions. The second goods fork assembly 32 may be driven by the second mounting plate 321 to separately rotate around the second cylindrical portion 333, to access or place goods in different directions. The first goods fork assembly 31 may be driven by the first mounting plate 311 and the second goods fork assembly 32 may be driven by the second mounting plate 321 to synchronously rotate and access or place goods, or, independently rotate and access or place goods.

Referring to FIG. 10 to FIG. 14, an access or place port of the first goods fork assembly 31 and an access or place port of the second goods fork assembly 32 both face a same direction. An end of the first mounting plate 311 close to the access or place port of the first goods fork assembly 31 and an end of the second mounting plate 321 close to the access or place port of the second goods fork assembly 32 are connected by at least one connecting post 341. The connecting post 341 enables the first mounting plate 311 and the second mounting plate 321 to synchronously rotate.

For example, two or more connecting posts 341 may be provided. The two or more connecting posts 341 are arranged at an interval between the end of the first mounting plate 311 close to the access or place port of the first goods fork assembly 31 and the end of the second mounting plate 321 close to the access or place port of the second goods fork assembly 32, which helps to ensure stability and reliability when the connecting post 341 is configured to drive the first mounting plate 311 and the second mounting plate 321 to synchronous rotate. Optionally, a contour of a projection of the second end of the plate-shaped portion 334, that is, an end of the plate-shaped portion 334 away from the shelving unit 20, onto the horizontal plane may be circular, so that the second end of the plate-shaped portion 334 can be kept from forming interference at the connecting post 341 connected between the first mounting plate 311 and the second mounting plate 321 in a process in which the first mounting plate 311 and the second mounting plate 321 synchronously rotate, which helps to ensure the smoothness of the rotation of the first goods fork assembly 31 and the second goods fork assembly 32.

In a first possible implementation, a second horizontal rotation mechanism is disposed on the first mounting plate 311. In an embodiment in which the first mounting plate 311 can separately rotate, the second horizontal rotation mechanism may drive the first mounting plate 311 to rotate, to achieve the objective of driving the first goods fork assembly 31 to separately rotate and access or place goods. In an embodiment in which the first mounting plate 311 and the second mounting plate 321 synchronously rotate, the second horizontal rotation mechanism may simultaneously drive the first mounting plate 311 and the second mounting plate 321 to synchronously rotate, to achieve the objective of driving the first goods fork assembly 31 and the second goods fork assembly 32 to synchronously rotate and access or place goods.

In a second possible implementation, a second horizontal rotation mechanism is disposed on the second mounting plate 321. In an embodiment in which the second mounting plate 321 can separately rotate, the second horizontal rotation mechanism may drive the second mounting plate 321 to rotate, to achieve the objective of drive the second goods fork assembly 32 to separately rotate and access or place goods. In an embodiment in which the first mounting plate 311 and the second mounting plate 321 synchronously rotate, the second horizontal rotation mechanism may simultaneously drive the first mounting plate 311 and the second mounting plate 321 to synchronously rotate, to achieve the objective of driving the first goods fork assembly 31 and the second goods fork assembly 32 to synchronously rotate and access or place goods.

In a third possible implementation, the second horizontal rotation mechanism is disposed on each of the first mounting plate 311 and the second mounting plate 321. The two second horizontal rotation mechanisms may respectively independently drive the first mounting plate 311 and the second mounting plate 321 to rotate, to enable the first goods fork assembly 31 and the second goods fork assembly 32 to respectively independently rotate and access or place goods. The two second horizontal rotation mechanisms may drive the first mounting plate 311 and the second mounting plate 321 to synchronously rotate, to enable the first goods fork assembly 31 and the second goods fork assembly 32 to synchronously rotate and access or place goods.

In an embodiment in which the first mounting plate 311 and the second mounting plate 321 are connected by the connecting post 341 and synchronously rotate:

Referring to FIG. 13, the second horizontal rotation mechanism includes a second rotation motor 3251, a second planetary gear 3252, a second central gear 3253, and a second flexible member 3254. In a possible implementation, the second rotation motor 3251 is mounted on a side of the second mounting plate 321 away from the plate-shaped portion 334. An output shaft of the second rotation motor 3251 passes through the second mounting plate 321 and extends into a gap between the second mounting plate 321 and the plate-shaped portion 334. The second planetary gear 3252 is transmission-connected to the output shaft of the second rotation motor 3251. For example, a planetary gear 343 may be directly fixedly sleeved on an output shaft of a rotation motor 342 to implement a transmission-connection, or, the planetary gear 343 is transmission-connected to an output shaft of the rotation motor 342 by a reducer. The second central gear 3253 is fixedly sleeved on the second cylindrical portion 333 or is formed by a peripheral face of the second cylindrical portion 333. The second flexible member 3254 surrounds a periphery of the second planetary gear 3252 and the second central gear 3253.

During specific implementation, the output shaft of the second rotation motor 3251 is configured to drive the second planetary gear 3252 to rotate. The second planetary gear 3252 rotates and at the same time is pulled by the second flexible member 3254 to rotate around the second central gear 3253, to drive the second mounting plate 321 to rotate, and the second mounting plate 321 is configured to drive the first mounting plate 311 through the connecting post 341 to rotate, to enable the first goods fork assembly 31 and the second goods fork assembly 32 to synchronously rotate.

For example, the second planetary gear 3252 and the second central gear 3253 are both sprockets, and the second flexible member 3254 is a chain; or, the second planetary gear 3252 and the second central gear 3253 are both pulleys, and the second flexible member 3254 is a transmission belt.

In another possible implementation, the second rotation motor 3251 is mounted on a side of the first mounting plate 311 away from the plate-shaped portion 334. An output shaft of the second rotation motor 3251 passes through the first mounting plate 311 and extends into a gap between the first mounting plate 311 and the flat plate-shaped portion 334. In this case, the second horizontal rotation mechanism is configured to drive the first mounting plate 311 to rotate, and the first mounting plate 311 is configured to drive the second mounting plate 321 through the connecting post 341 to rotate, to enable the first goods fork assembly 31 and the second goods fork assembly 32 to synchronously rotate.

Referring to FIG. 10 to FIG. 14, the second goods fork assembly 32 further includes a second width adjustment mechanism. The second width adjustment mechanism includes a second width motor 3231 and at least one second bidirectional spiral screw rod 3232. The second width motor 3231 is mounted on the second mounting plate 321. For example, the second width motor 3231 may be directly mounted on the second mounting plate 321, or may be mounted on the second mounting plate 321 by a mounting base. Two ends of the second bidirectional spiral screw rod 3232 are respectively threadedly connected to the two second side plates 322. A middle of the second bidirectional spiral screw rod 3232 is rotatably connected to the second mounting plate 321. The second width motor 3231 is transmission-connected to the at least one second bidirectional spiral screw rod 3232. During specific implementation, the second width motor 3231 may drive the second bidirectional spiral screw rod 3232 to rotate, and is configured to drive the two second side plates 322 to move toward each other or away from each other. It may be understood that threads with opposite rotational directions are disposed at the two ends of the second bidirectional spiral screw rod 3232.

In a possible implementation, two second bidirectional spiral screw rods 3232 may be provided, and the two second bidirectional spiral screw rods 3232 are arranged in parallel and at an interval. The second width motor 3231 is disposed between the two second bidirectional spiral screw rods 3232, and the second width motor 3231 simultaneously is configured to drive the two second bidirectional spiral screw rods 3232 through a synchronous belt and a pulley to rotate. The two second bidirectional spiral screw rods 3232 are disposed in parallel and at an interval, which helps to ensure that the stability and reliability of the two second side plates 322 moving toward each other or away from each other. In another implementation, a quantity of the second bidirectional spiral screw rods 3232 may be increased according to an actual requirement. Details are not described herein again.

For example, a synchronous pulley is sleeved on each of the two second bidirectional spiral screw rods 3232, or, a synchronous pulley is formed on a peripheral face of each of the two second bidirectional spiral screw rods 3232, and a drive pulley is sleeved on an output shaft of the second width motor 3231, or, an output shaft of the second width motor 3231 is transmission-connected to a drive pulley by a reducer. The synchronous belt is wound around on the synchronous pulleys of the two second bidirectional spiral screw rods 3232 and the drive pulley of the second width motor 3231, to enable the second width motor 3231 to drive the drive pulley to rotate. The drive pulley is configured to drive the synchronous pulleys of the two second bidirectional spiral screw rods 3232 through the synchronous belt to rotate, to enable the two second bidirectional spiral screw rods 3232 to synchronously rotate, so that the two second side plates 322 are driven to move toward each other or away from each other, making it convenient to enable the second goods fork assembly 32 to be tightly clamp goods or release goods.

Continuing to refer to FIG. 10 to FIG. 14, a second accommodating groove 3211 may be provided in the second mounting plate 321, and the second width motor 3231 is accommodated in the second accommodating groove 3211, which helps to reduce interference and increase structural compactness. The second accommodating groove 3211 may be a concave groove provided in the second mounting plate 321, and the second width motor 3231 may be accommodated and mounted in the concave groove. The second accommodating groove 3211 may be alternatively a through groove penetrating the second mounting plate 321, and the second width motor 3231 may be accommodated and mounted in the through groove. When the second accommodating groove 3211 penetrates the second mounting plate 321, the structure located below (referring to the orientation in FIG. 12) the second mounting plate 321 may be provided with an accommodating groove, to better accommodate the second width motor 3231. The second width motor 3231 may be accommodated and mounted in the through groove and the accommodating groove in the structure below the second mounting plate 321.

Referring to FIG. 10, FIG. 12, and FIG. 14, at least two second screw rod supports 3233 may be disposed at an interval on a face of the second mounting plate 321 away from the connecting base 33 in an extension direction of the second bidirectional spiral screw rod 3232, and the second bidirectional spiral screw rod 3232 is rotatably connected to the second screw rod supports 3233. For example, a through hole may be provided in the second screw rod support 3233, and the second bidirectional spiral screw rod 3232 is rotatably passed in the through hole, or, a slot may be provided in the second screw rod support 3233, and the second bidirectional spiral screw rod 3232 is rotatably accommodated in the slot.

Referring to FIG. 10 to FIG. 13, a second fork arm assembly may be mounted on each of the two second side plates 322, and the second fork arm assembly includes a second telescopic motor 3241 and a second fork arm 3242. The second telescopic motor 3241 is disposed on a side of the second side plate 322 away from the second mounting plate 321, and the second fork arm 3242 is disposed on a side of the second side plate 322 facing the second mounting plate 321. The second telescopic motor 3241 is transmission-connected to the second fork arm 3242. For example, the second telescopic motor 3241 and the second fork arm 3242 may be transmission-connected by a gear and a rack, or may be transmission-connected by a transmission belt, or may be transmission-connected by another transmission mechanism known to persons skilled in the art, to enable the second telescopic motor 3241 to drive the second fork arm 3242 to extend and retract in a length direction of the second goods fork assembly 32.

For example, the second fork arm 3242 may include a plurality of second sub-fork arms. The plurality of second sub-fork arms are sequentially connected, and may sequentially extend or retract, which helps to increase an extension length of the second fork arm 3242. A finger structure may be disposed at a front end of the second fork arm 3242. When the second fork arm 3242 extends and takes goods, the finger structure may rotate and block an end of the goods away from the second goods fork assembly 32, making it convenient to apply a pushing force to the goods, to enable the goods to move onto the second goods fork assembly 32 along with the retraction of the second fork arm 3242.

During specific implementation, after extending, the two second fork arms 3242 on the two second side plates 322 may clamp goods from two sides of the goods and retract, to move the goods into the second goods fork assembly 32; or in a retracted state, the two second fork arms 3242 on the two second side plates 322 clamp goods from two sides of the goods and extend, to move the goods out of the second goods fork assembly 32.

Referring to FIG. 10, at least two, for example, two, three or more, second movable fingers 3243 may be disposed at a front end of the second fork arm 3242 in an extending direction. The at least two second movable fingers 3243 are arranged at an interval in the elevation direction. A first end of the second movable finger 3243 is rotatably connected to the second fork arm 3242, and a second end of the second movable finger 3243 may be rotatable between the two second fork arms 3242. During specific implementation, in an extending process of the second fork arm 3242, the second movable finger 3243 is kept in a state of being parallel to the second fork arm 3242, to avoid hindering the second fork arm 3242 from extending to two sides of goods. When the second fork arm 3242 extends and holds goods, the second movable finger 3243 may rotate and block an end of the goods away from the connecting base 33, so that in a retraction process of the second fork arm 3242, the second movable finger 3243 may push the goods to move to the second goods fork assembly 32 following the second fork arm 3242. The at least two second movable fingers 3243 may push goods from different positions of the goods, to enable the goods to be smoothly transferred to the second goods fork assembly 32. The at least two second movable fingers 3243 may rotate and open in the same direction or in opposite directions.

Continuing to refer to FIG. 10, a second fixed pushing plate 3244 may be disposed at a rear end of the second fork arm 3242 in the extending direction, and a shape of the second fixed pushing plate may be a rectangle or may be another shape. During specific implementation, in a process in which the second fork arm 3242 extends and transfers goods on the second goods fork assembly 32, the second fixed pushing plate 3244 may push the goods from the rear of the goods in the extending direction, to smoothly transfer the goods out from the second goods fork assembly 32.

Referring to FIG. 8, the second goods fork assembly 32 may further include a tray 326. The tray 326 is mounted on a side of the second mounting plate 321 away from the connecting base 33, and the second width adjustment mechanism is located between the tray 326 and the second mounting plate 321. The tray 326 can bear goods on the second goods fork assembly 32. In addition, a mechanism located between the tray 326 and the second mounting plate 321 may be protected.

Optionally, in a width direction of the second goods fork assembly 32, a width of the tray 326 is less than or equal to a width of the second mounting plate 321. In this way, the width adjustment mechanism of the second goods fork assembly 32 can smoothly adjust a width between the two second side plates 322, to keep two sides of the tray 326 from abutting against the two second side plates 322 and restricting an adjustment range of the width between the two second side plates 322.

In summary, for the carrying robot provided in this embodiment of the present disclosure, the first goods fork assembly 31 is connected to a side of the second end of the connecting base 33 facing the movement chassis 10, and the second goods fork assembly 32 is connected to the side of the second end of the connecting base 33 away from the movement chassis 10. The first goods fork assembly 31 can be enabled to access or place goods at relatively low positions, and the second goods fork assembly 32 can be enabled to access or place goods at relatively high positions, which helps to extend a take-out range of the carrying robot in a height direction. In addition, the carrying robot may simultaneously perform two carrying tasks, which helps to increase the carrying efficiency of the carrying robot, and reduce a time taken to access or place target goods.

It needs to be noted that the features in each of the above embodiments can be applied to other embodiments without causing any conflict. Details are not described herein again.

In the description of the present disclosure, it should be understood that orientation or position relationships indicated by the terms such as "center", "longitudinal", "transverse", "length", "width", "thickness", "above", "below", "front", "back", "left", "right", "vertical", "horizontal" "top", "bottom", "inside", and "outside" are based on orientation or position relationships shown in the accompanying drawings, and are used only for ease and brevity of illustration and description of embodiments of the present disclosure, rather than indicating or implying that the mentioned apparatus or component needs to have a particular orientation or needs to be constructed and operated in a particular orientation. Therefore, such terms should not be construed as limiting of the present disclosure.

In the description of the present disclosure, it needs to be understood that the terms "include", "contain" and any other variants used herein mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Unless otherwise explicitly specified or defined, "mount", "connect", "connection", "fixed", and the like should be understood in a broad sense. For example, the connection may be a fixed connection, a detachable connection, or an integral connection; or the connection may be a direct connection, an indirect connection through an intermediary, or internal communication between two components. Persons of ordinary skill in the art can understand specific meanings of the terms in the present disclosure based on specific situations. In addition, the terms such as "first", "second", and the like are used only for the purpose of description, and should not be understood as indicating or implying the relative importance or implicitly specifying the quantity of the indicated technical features.

Finally, it should be noted that the foregoing embodiments are merely used for describing the technical solutions of the present disclosure, but are not intended to limit the present disclosure. Although the present disclosure is described in detail with reference to the foregoing embodiments, it should be appreciated by persons skilled in the art that, modifications may still be made to the technical solutions recorded in the foregoing embodiments, or equivalent replacements may be made to the part of all of the technical features; and these modifications or replacements will not cause the essence of corresponding technical solutions to depart from the scope of the technical solutions in the embodiments of the present disclosure.

What is claimed is:

1. A carrying robot, comprising a movement chassis, a shelving unit, and a carrying apparatus, wherein the shelving unit is disposed on the movement chassis;

the carrying apparatus comprises a connecting base and a first goods fork assembly, a first end of the connecting base is connected to a side of the shelving unit, a second end of the connecting base is configured to extend in a horizontal direction away from the shelving unit, and the connecting base is configured to move vertically relative to the shelving unit; and the first goods fork assembly comprises a first mounting plate and two first side plates, and the first mounting plate is connected to a side of the second end of the connecting base facing the movement chassis; and the two first side plates are disposed opposite on two sides of the first mounting plate in a width direction of the first goods fork assembly, and the two first side plates are configured to extend toward the movement chassis;

wherein the carrying apparatus further comprises a second goods fork assembly, the second goods fork assembly comprises a second mounting plate and two second side plates, and the second mounting plate is connected to a side of the second end of the connecting base away from the movement chassis; and the two second side plates are disposed opposite on two sides of the second mounting plate in a width direction of the second goods fork assembly, and the two second side plates are configured to extend away from the movement chassis;

wherein the connecting base comprises a second cylindrical portion and a plate-shaped portion, a first end of the plate-shaped portion is connected to a side of the shelving unit, and a second end of the plate-shaped portion is configured to extend in the horizontal direction away from the shelving unit; and the second cylindrical portion is disposed at the second end of the plate-shaped portion, and the second cylindrical portion is configured to extend in a direction perpendicular to the plate-shaped portion toward two opposite faces of the plate-shaped portion; and the first mounting plate is rotatably connected to an end of the second cylindrical portion facing the movement chassis, and/or, the second mounting plate is rotatably connected to an end of the second cylindrical portion away from the movement chassis.

2. The carrying robot according to claim 1, wherein a first goods pallet is disposed at an end of each of the two first side plates away from the first mounting plate, and the two first goods pallets are located in a same plane and are configured to extend opposite between the two first side plates.

3. The carrying robot according to claim 1, wherein the first goods fork assembly further comprises a first width adjustment mechanism, the first width adjustment mechanism comprises a first width motor and at least one first bidirectional spiral screw rod, and the first width motor is mounted on the first mounting plate; and two ends of the first bidirectional spiral screw rod are respectively threadedly connected to the two first side plates, and a middle of the first bidirectional spiral screw rod is rotatably connected to the first mounting plate; and the first width motor is transmission-connected to the at least one first bidirectional spiral screw rod, and the first width motor is configured to drive the first bidirectional spiral screw rod to rotate, and is configured to drive the two first side plates to move toward each other or away from each other.

4. The carrying robot according to claim 2, wherein in the width direction of the first goods fork assembly, a sum of widths of the two first goods pallets is less than or equal to a width of the first mounting plate.

5. The carrying robot according to claim 1, wherein a first fork arm assembly is mounted on each of the two first side plates, and the first fork arm assembly comprises a first telescopic motor and a first fork arm; and the first telescopic motor is disposed on a side of the first side plate away from the first mounting plate, and the first fork arm is disposed on a side of the first side plate facing the first mounting plate; and the first telescopic motor is transmission-connected to the first fork arm, and the first telescopic motor is configured to drive the first fork arm to extend and retract in a length direction of the first goods fork assembly.

6. The carrying robot according to claim 5, wherein at least two first movable fingers are disposed at a front end of the first fork arm in an extending direction, and the at least two first movable fingers are arranged at an interval from ends close to the first mounting plate to ends away from the first mounting plate;

a first end of the first movable finger is rotatably connected to the first fork arm, and a second end of the first movable finger is rotatable between the two first fork arms.

7. The carrying robot according to claim 1, wherein the connecting base comprises a fixed portion and a rotatable portion, a first end of the fixed portion is connected to a side of the shelving unit, and a second end of the fixed portion is configured to extend in the horizontal direction away from the shelving unit; and the rotatable portion is rotatably sleeved on the second end of the fixed portion, and the rotatable portion is rotatable around the fixed portion in a vertical plane; and the first mounting plate is connected to the rotatable portion, to enable the rotatable portion to drive the first goods fork assembly to rotate around the fixed portion in the vertical plane.

8. The carrying robot according to claim 7, wherein a rotation range of the first goods fork assembly is 0° to 180°; and a rotation start position of the first goods fork assembly is a position close to the movement chassis, a rotation stop position of the first goods fork assembly is a position far away from the movement chassis, and the first goods fork assembly is reciprocally configured to rotate between the rotation start position and the rotation stop position.

9. The carrying robot according to claim 7, wherein the rotatable portion comprises a flat plate support portion and a rotation connection portion, and the rotation connection portion is connected to a face of the flat plate support portion facing the fixed portion;

the first mounting plate is connected to a face of the flat plate support portion away from the fixed portion; and two rotation connection portions are provided, the two rotation connection portions are respectively located at two ends of the flat plate support portion in an extension direction of the fixed portion, and the two rotation connection portions are both rotatably sleeved on the fixed portion.

10. The carrying robot according to claim 9, wherein a vertical rotation mechanism is disposed between the two rotation connection portions, and the vertical rotation mechanism is configured to drive the rotatable portion to rotate around the fixed portion; and the vertical rotation mechanism comprises a drive motor, a first gear, and a second gear, the drive motor is mounted on the face of the flat plate support portion facing the fixed portion, the first gear is fixedly sleeved on an output shaft of the drive motor, the second gear is fixedly sleeved on the fixed portion, and the first gear and the second gear are engaged with each other.

11. The carrying robot according to claim 9, wherein a first cylindrical portion is disposed on a side of the flat plate support portion facing the first mounting plate, and the first mounting plate is rotatably connected to an end of the first cylindrical portion away from the flat plate support portion; and a first horizontal rotation mechanism is disposed on the first mounting plate, and the first horizontal rotation mechanism is configured to drive the first mounting plate to rotate in a horizontal plane relative to the first cylindrical portion.

12. The carrying robot according to claim 11, wherein the first horizontal rotation mechanism comprises a first rotation motor, a first planetary gear, a first central gear, and a first flexible member; and the first rotation motor is mounted on a side of the first mounting plate away from the first cylindrical portion, an output shaft of the first rotation motor is configured to pass through the first mounting plate and is configured to extend into a gap between the first mounting plate and the flat plate support portion, the first planetary gear is transmission-connected to the output shaft of the first rotation motor; the first central gear is fixedly sleeved on the first cylindrical portion or is formed by a peripheral face of the first cylindrical portion; and the first flexible member is configured to surround a periphery of the first planetary gear and the first central gear.

13. The carrying robot according to claim 1, wherein a second horizontal rotation mechanism is disposed on at least one of the first mounting plate and the second mounting plate, and the second horizontal rotation mechanism is configured to drive at least one of the first mounting plate and the second mounting plate to rotate.

14. The carrying robot according to claim 13, wherein an access or place port of the first goods fork assembly and an access or place port of the second goods fork assembly both face a same direction, and an end of the first mounting plate close to the access or place port of the first goods fork assembly and an end of the second mounting plate close to the access or place port of the second goods fork assembly are connected by at least one connecting post; and the connecting post is configured to enable the first mounting plate and the second mounting plate to synchronously rotate.

15. The carrying robot according to claim 14, wherein the second horizontal rotation mechanism comprises a second rotation motor, a second planetary gear, a second central gear, and a second flexible member; and the second rotation motor is mounted on a side of the second mounting plate away from the plate-shaped portion, an output shaft of the second rotation motor is configured to pass through the second mounting plate and is configured to extend into a gap between the second mounting plate and the plate-shaped portion, and the second planetary gear is transmission-connected to the output shaft of the second rotation motor; the second central gear is fixedly sleeved on the second cylindrical portion or is formed by a peripheral face of the second cylindrical portion; and the second flexible member is configured to surround a periphery of the second planetary gear and the second central gear.

16. The carrying robot according to claim 1, wherein the second goods fork assembly further comprises a second width adjustment mechanism, the second width adjustment mechanism comprises a second width motor and at least one second bidirectional spiral screw rod, and the second width motor is mounted on the second mounting plate; and two ends of the second bidirectional spiral screw rod are respectively threadedly connected to the two second side plates, and a middle of the second bidirectional spiral screw rod is rotatably connected to the second mounting plate; and the second width motor is transmission-connected to the at least one second bidirectional spiral screw rod, and the second width motor is configured to drive the second bidirectional spiral screw rod to rotate, and is configured to drive the two second side plates to move toward each other or away from each other.

17. The carrying robot according to claim 1, wherein a second fork arm assembly is mounted on each of the two second side plates, and the second fork arm assembly comprises a second telescopic motor and a second fork arm; and the second telescopic motor is disposed on a side of the second side plate away from the second mounting plate, and the second fork arm is disposed on a side of the second side plate facing the second mounting plate; and the second telescopic motor is transmission-connected to the second fork arm, and the second telescopic motor is configured to drive the second fork arm to extend and retract in a length direction of the second goods fork assembly.

18. The carrying robot according to claim 17, wherein at least two second movable fingers are disposed at a front end of the second fork arm in an extending direction, and the at least two second movable fingers are arranged at an interval from ends close to the second mounting plate to ends away from the second mounting plate; and a second end of the second movable finger is rotatably connected to the second fork arm, and a second end of the second movable finger is rotatable between the two second fork arms.

* * * * *